United States Patent [19]
Hirose et al.

[11] Patent Number: 5,532,030
[45] Date of Patent: Jul. 2, 1996

[54] POLYOLEFIN MULTILAYER LAMINATE, VESSEL AND PACKAGING MATERIAL

[75] Inventors: Toshiyuki Hirose; Shigetoshi Nishijima; Yohzoh Yamamoto; Hideshi Kawachi; Michio Tsugawa, all of Kuga-Gun, Japan

[73] Assignee: Mitsui Petrochemical Industries, Ltd., Tokyo, Japan

[21] Appl. No.: 451,812

[22] Filed: May 26, 1995

Related U.S. Application Data

[63] Continuation of Ser. No. 329,262, Oct. 26, 1994, abandoned.

[30] Foreign Application Priority Data

Oct. 26, 1993 [JP] Japan .................................. 5-267045
Jul. 5, 1994 [JP] Japan .................................. 6-153986

[51] Int. Cl.$^6$ ........................... B29D 22/00; B29D 23/00
[52] U.S. Cl. ...................... 428/35.7; 428/218; 428/516; 428/36.91; 428/910; 428/517; 428/520
[58] Field of Search ................. 428/35.7, 36.91, 428/516, 218, 220

[56] References Cited

U.S. PATENT DOCUMENTS

| | | | |
|---|---|---|---|
| 4,874,808 | 10/1989 | Minami et al. | 524/291 |
| 5,298,551 | 3/1994 | Yamamoto | 525/211 |

FOREIGN PATENT DOCUMENTS

| | | |
|---|---|---|
| 0518542 | 12/1992 | European Pat. Off. . |
| 5177776 | 7/1993 | European Pat. Off. . |
| 0570188 | 11/1993 | European Pat. Off. . |
| 0610814 | 8/1994 | European Pat. Off. . |

*Primary Examiner*—P. C. Sluby
*Attorney, Agent, or Firm*—Birch, Stewart, Kolasch & Birch

[57] ABSTRACT

A polyolefin multilayer laminate in which a first layer (A) made of a cycloolefin-based resin, such as an ethylene/cycloolefin random copolymer resulting from copolymerization of ethylene and a cycloolefin represented by the formula (1) given below, or a cycloolefin-based resin blend and a second layer (B) made of an olefin (co)polymer or a composition containing it are laminated. This laminate can be used as a packaging material which is superior in the interlayer adhesion, shapability, moistureproof property, transparency, flexibility, easiness of hand-cutting, heat-sealability and dead-hold property. Formula (1) comprises

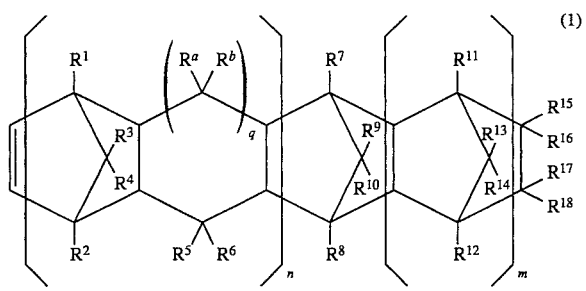

in which n and q are 0 or 1, m is 0 or any positive integer, $R^1$–$R^{18}$ and $R^a$ and $R^b$ denote each H, a halogen atom or a hydrocarbon group, wherein $R^{15}$–$R^{18}$ may form, by combining with each other, a monocyclic or polycyclic ring, which may have double bond(s), and wherein $R^{15}$–$R^{16}$ may have terminal-located alkylidene group.

15 Claims, 1 Drawing Sheet

POLYOLEFIN MULTILAYER LAMINATE, VESSEL AND PACKAGING MATERIAL

This application is a continuation of application Ser. No. 08/329,262, filed on Oct. 26, 1994, now abandoned, the entire contents of which are hereby incorporated by reference.

FIELD OF THE INVENTION

BACKGROUND OF THE INVENTION

The present invention relates to a multilayer laminate in which sheets or films based on polyolefin are laminated and more specifically to a polyolefin multilayer laminate adapted for a forming material for packing and the use thereof.

DISCUSSION OF RELATED ART

As packing material for packaging articles of daily use, household goods, foods, drug tablets and so on, many functional properties are required, for example, transparency, moistureproof property, heat-sealability, vacuum or pneumatic formability and hand-shapability. Thus, such a variety of requirements are not sufficiently satisfied with one single resin, so that there have widely been used multilayer laminates which are made by laminating a sheet or film of one resin with a sheet or film of another resin.

On the other hand, there is a general trend that preference is given to polyolefin resins as the film material in view of recycling of material or problems with the incineration. While cycloolefin resins are superior in transparency, moistureproof property, vacuum or pneumatic formability, deadhold property and so on, they are subject to a sudden softening at around the glass transition temperature, since they are non-crystalline, resulting in a decrease in the modulus of elasticity, strength and so on. For this reason, there is a problem that the permissible range in choosing the conditions for heat-sealing, inflation molding and vacuum or pneumatic forming is narrow and, for certain applications, the flexibility of the resulting film is too low.

SUMMARY OF THE INVENTION

The object of the present invention is to solve the above-mentioned problems and to provide a multilayer laminate based on polyolefins, which are superior in the interlayer bonding property, formability, moistureproof property, transparency, flexibility, easiness of hand-cutting, heat-sealability and dead-hold property and are also superior in their processibility by vacuum or pneumatic forming, as well as sheet or film products made of such polyolefin multilayer laminate and packaging materials formed using this laminate, such as press through packs and blister packs.

The polyolefin multilayer laminate of the present invention comprises at least two layers of (A) a first layer selected from the group consisting of
(A1) a layer made of at least one cycloolefin-based resin selected from the group consisting of
(a-1) an ethylene/cycloolefin random copolymer obtained by copolymerizing a cycloolefin represented by the general formula (1) or (2) given below with ethylene,
(a-2) a ring-opening (co)polymer of cycloolefin(s) represented by the general formula (1) or (2) given below or its hydrogenation product and
(a-3) a graft-modification product of said ethylene/cycloolefin random copolymer (a-1) or of the ring-opening (co)polymer or its hydrogenation product (a-2) and
(A2) a layer made of a cycloolefein-based resin composition composed of
(a) at least one cycloolefin-based resin selected from the group consisting of the ethylene/cycloolefin random copolymer (a-1), the ring-opening (co)polymer or its hydrogenation product (a-2) and the graft-modification product (a-3) and
(b) a polyolefin, and (B) a second layer made of an olefin (co)polymer or a composition containing it:

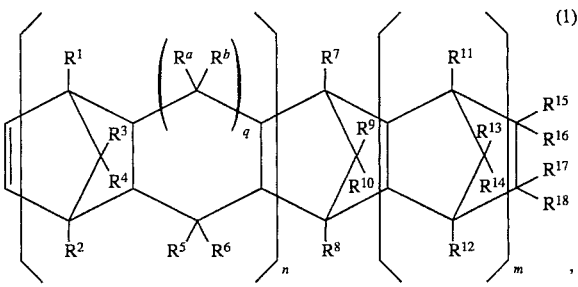

wherein n is zero or 1, m is zero or any positive integer, q is zero or 1, $R^1$–$R^{18}$ as well as $R^a$ and $R^b$ represent each independently of each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by joining the chemical bonds together; and

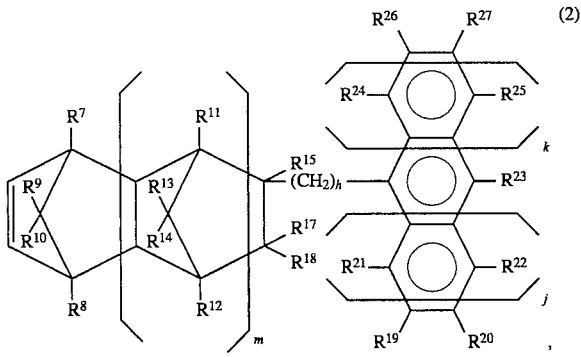

wherein m is zero or any positive integer, h is zero or any positive interger, j and k denote each zero, 1 or 2, $R^7$–$R^{15}$ as well as $R^{17}$–$R^{18}$ represent each independently of each other an atom or a radical selected from the group consisting of hydrogen atom, halogen atoms and hydrocarbon groups and $R^{19}$–$R^{27}$ represent each independently of each other an atom or a radical selected from the group consisting of hydrogen atom, halogen atoms, hydrocarbon groups and alkoxy groups.

Thus, the polyolefin multilayer laminate of the present invention includes, on the one hand, a laminate composed of a first layer (A) made of a resin based on a specific cycloolefin (A1) and a second layer (B) made of a resin based on an olefin (co)polymer or a composition containing it and, on the other hand, a laminate composed of a first layer (A) made of a resin composition based on a specific cycloolefin with a polyolefin resin (A2) and a second layer (B) made of a resin based on an olefin (co)polymer or a composition containing it.

The vessel or the packaging material according to the present invention is characterized by being made of such a polyolefin multilayer laminate as above.

According to the present invention, either one of the first layer (A) made of the cycloolefin-based resin or resin composition (denoted hereinafter sometimes as "layer A") or the second layer (B) made of the resin based on an olefin (co)polyer or a composition containing it (denoted below sometimes as "layer B") may contain a modification product of the resin.

BRIEF DESCRIPTION OF THE DRAWING

The FIGURE illustrates sectional view of a blister pack including a piece of article to be packed in the blister.

DETAILED DESCRIPTION OF THE INVENTION

Figure 1:
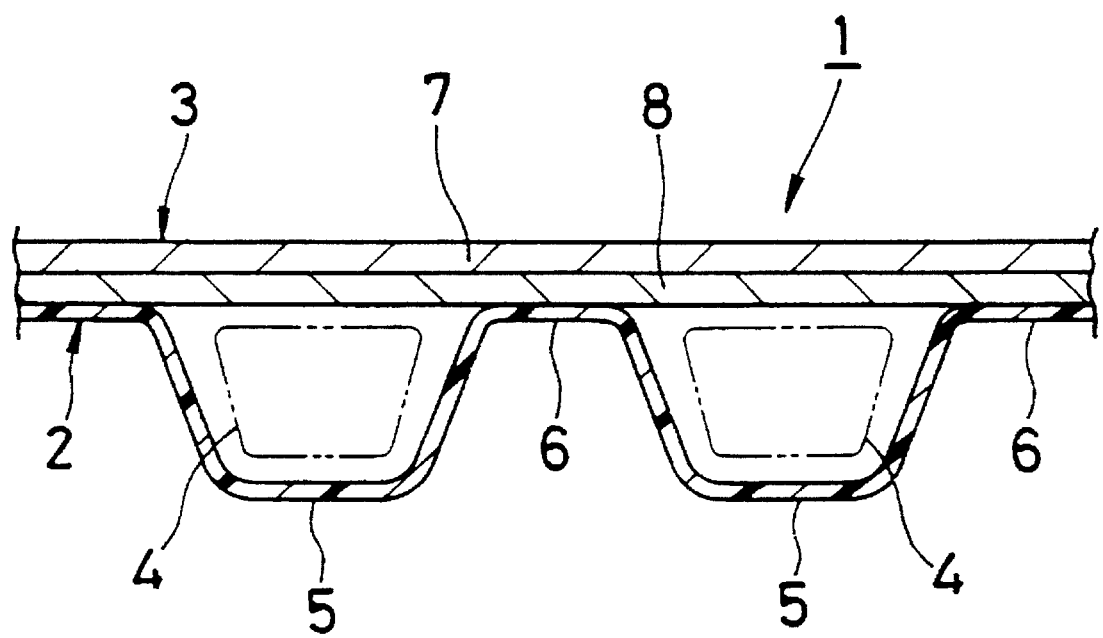

Below, the polyolefin multilayer laminate according to the present invention and applications thereof are explained.

The explanation is directed first to the resins to be used as the materials for the polyolefin multilayer laminate according to the present invention.

(A) Cycloolefin-based Resin or Composition containing it

First, the cyclolefin-based resin (A1) and the cyclolefin-based resin composition (A2) containing the cyclolefin-based resin to be used as the material of one of the layers constituting the polyolefin multilayer laminate are explained.

For the cycloolefin-based resin (A1) to be employed according to the present invention, there may be enumerated:

(a-1) a random copolymer of ethylene with a cycloolefin represented by the formula (1) or (2) given above, (a-2) a ring-opening (co)polymer of the cycloolefin represented by the formula (1) or (2) or a hydrogenation product thereof, or (a-3) a graft-modification product of above (a-1) or (a-2).

The cycloolefin-based resin (A1) to be employed according to the present invention has a softening temperature (TMA) of usually −40° C. or higher, preferably 0°–180° C., more preferably 50°–180° C., as determined on a Thermal Mechanical Analyzer. The softening temperature (TMA) is determined by placing a quartz needle having a diameter of 1.0 mm vertically on a sample sheet to be tested while holding the needle under a pressing load of 49 gram with a constant rate of elevation of the sheet temperature of 5° C. per minute and observing the temperature at the point at which the needle top has penetrated into the test sheet to a depth of 0.635 mm.

The cycloolefin-based resin (A1) has an intrinsic viscosity (η) of 0.01–10 dl/g, preferably 0.05–2.0 dl/g, more preferably 0.4–1.2 dl/g, as determined in decalin at 135° C.

The cycloolefin-based (A1) resin has further a glass transition temperature (Tg) of, usually, −30° C. or higher, preferably −10°–170° C., and a degree of crystallinity of, usually, 0 −20%, preferably 0–2%, as determined by X-ray diffraction method.

Now, the cycloolefin to be used in producing the cycloolefin-based resin (A1), such as above, is explained.

As the cycloolefin, compounds represented by the formula (1) or (2) given above are employed.

In the formula (1), n is zero or 1 and m is zero or an any positive integer.

$R^1$–$R^{18}$ as well as $R^a$ and $R^b$ represent each independently of each other an atom or a radical selected from the group consisting of hydrogen atom, halogen atoms and hydrocarbon groups.

The halogen atom is fluorine, chlorine, bromine or iodine.

As the hydrocarbon groups, there may be enumerated, in general, alkyl groups having 1–20 carbon atoms, halogenated alkyl groups having 1–20 carbon atoms, cycloalkyl groups having 3–15 carbon atoms and aromatic hydrocarbon groups having 6–20 carbon atoms. More specifically, the alkyl groups may be, for example, methyl, ethyl, propyl, isopropyl, amyl, hexyl, octyl, decyl, dodecyl and octadecyl. The halogenated alkyl groups may be those in which the hydrogen atoms of the alkyl group are substituted at least partly by fluorine atom, chlorine atom, bromine atom or iodine atom.

The cycloalkyl groups may include, for example, cyclohexyl and the like. The aromatic hydrocarbon groups may include, for example, phenyl, naphthyl and so on.

It is permissible also that a monocyclic ring or a polycyclic ring may be formed by the combination (with each other) of each of the pairs consisting of $R^{15}$ with $R^{16}$, $R^{17}$ with $R^{18}$, $R^{15}$ with $R^{17}$, $R^{16}$ with $R^{18}$, $R^{15}$ with $R^{18}$ and $R^{16}$ with $R^{17}$ respectively, wherein the monocyclic or polycyclic ring formed in this manner may have one or more double bonds. As the monocyclic or polycyclic ring thus formed, specifically the followings may be enumerated:

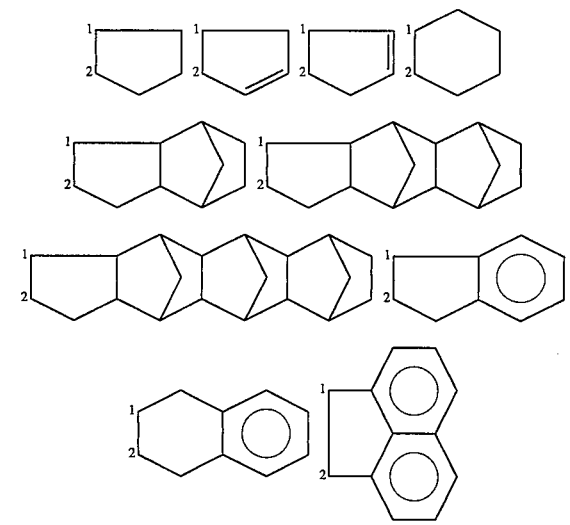

In the above exemplifications, the carbon atom marked with a numeral 1 or 2 indicates that carbon atom to which either $R^{15}(R^{16})$ or $R^{17}(R^{18})$ of the formula (1) is combined.

Further, it is also possible that an alkylidene group may be formed under the combination of either $R^{15}$ with $R^{16}$ or $R^{17}$ with $R^{18}$. Such alkylidene groups may, in general, have 2–20 carbon atoms and concrete examples therefor include ethylidene, propylidene and isopropylidene.

As preferred cycloolefin among those represented by the general formula (1), those expressed by the following formula (1-1) may be enumerated:

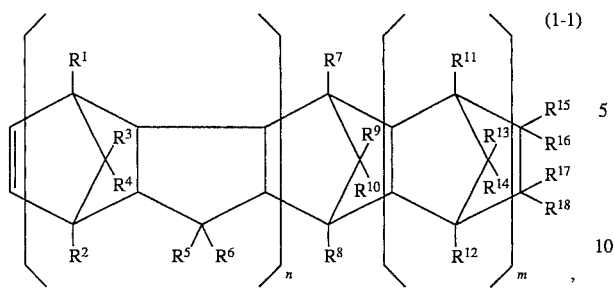

(1-1)

wherein n, m and $R^1$–$R^{18}$ are the same as those of the formula (1).

As the cycloolefin, compounds represented by the formula (2) can also be employed.

In the formula (2), h is 0 or a positive integer, j and k are 0, 1 or 2, m and $R^7$–$R^{15}$ as well as $R^{17}$–$R^{18}$ are the same as those of the general formula (1) and $R^{19}$–$R^{27}$ denote each, independently of each other, an atom or a radical selected from the group consisting of hydrogen atom, halogen atoms, hydrocarbon groups and alkoxy groups.

The halogen atoms herein are the same as those of the formula (1).

As the hydrocarbon groups of $R^{19}$–$R^{27}$ of the general formula (2), there may be enumerated in general, independently of each other, alkyl groups having 1–20 carbon atoms, halogenated alkyl groups having 1–20 carbon atoms, cycloalkyl groups having 3–15 carbon atoms and aromatic hydrocarbon groups having 6–20 carbon atoms. Concrete examples include, for the alkyl group, methyl, ethyl, propyl, isopropyl, amyl, hexyl, octyl, decyl, dodecyl and octadecyl; and for the halogenated alkyl group, those in which at least a part of hydrogen atoms in the above-exemplified alkyl groups is replaced by fluorine atom, chlorine atom, bromine atom or iodine atom.

For the cycloalkyl group, cyclohexyl and the like are exemplified. The aromatic hydrocarbon group may include aryl groups, aralkyl groups and so on, concrete examples of which include phenyl, tolyl, naphthyl, benzyl and phenyl ethyl.

For the alkoxy group, there may be enumerated methoxy, ethoxy and propoxy. It is permissible here, that the carbon atom to which $R^{17}$ and $R^{18}$ are combined is bonded directly or under intermediation of an alkylene group having 1–3 carbon atoms to the carbon atom to which $R^{21}$ is combined or to the carbon atom to which $R^{19}$ is combined. Thus, in case the two carbon atoms mentioned above are combined under intermediation by an alkylene group, the radicals represented by $R^{17}$ and $R^{21}$ respectively or the radicals represented by $R^{18}$ and $R^{19}$ respectively will form together an alkylene group selected among methylene (—$CH_2$—), ethylene (—$CH_2CH_2$—) and trimethylene (—$CH_2CH_2CH_2$—).

In the case of j=k=0, the radical pair $R^{23}$ with $R^°$ or $R^{23}$ with $R^{27}$ may form a monocyclic or polycyclic aromatic ring by combining with each other. Examples of the monocyclic or polycyclic aromatic ring in case the radical pair $R^{23}$ with $R^°$ forms an aromatic ring when j=k=0 include the groups given below.

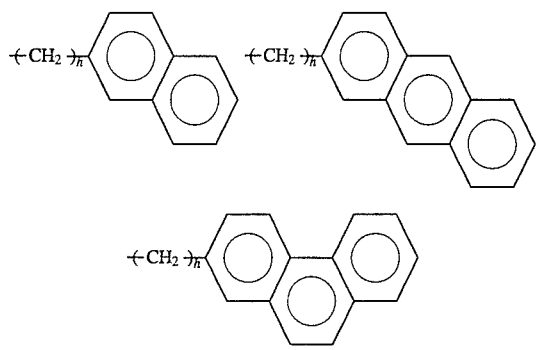

In the above exemplified formula, the symbol h is the same as that in the formula (2).

Specific examples of the cycloolefin monomer represented by the general formulas (1) and (2) are:

derivatives of bicyclo(2.2.1)hept-2-ene,
derivatives of tetracyclo[4.4.0.$1^{2,5}$.$1^{7,10}$]-3-dodecene,
derivatives of hexacyclo(6.6.1.$1^{3,6}$.$1^{10,13}$.$0^{2,7}$.$0^{9,14}$)-4-heptadecene,
derivatives of octacyclo(8.8.0.$1^{2,9}$.$1^{4,7}$.$1^{11,18}$.$1^{13,16}$.$0^{3,8}$.$0^{12,17}$)-5-docosene,
derivatives of pentacyclo[6.6.1.$1^{3,6}$.$0^{2,7}$.$0^{9,14}$]-4-hexadecene,
derivatives of heptacyclo-5-eicosene,
derivatives of heptacyclo-5-heneicosene,
derivatives of tricyclo(4.3.0.$1^{2,5}$)-3-decene,
derivatives of tricyclo(4.4.0.$1^{2,5}$)-3-undecene,
derivatives of pentacyclo[6.5.1.$1^{3,6}$.$0^{2,7}$.$0^{9,13}$]-4-pentadecene,
derivatives of pentacyclopentadecadiene,
derivatives of pentacyclo(7.4.0.$1^{2,5}$.$1^{9,12}$.$0^{8,13}$)-3-pentacecene,
derivatives of heptacyclo(8.7.0.$1^{3,6}$.$1^{10,17}$.$1^{12,15}$.$0^{2,7}$.$0^{11,16}$)-4-eicosene,
derivatives of nonacyclo(10.9.1.$1^{4,7}$.$1^{13,20}$.$1^{15,18}$.$0^{3,8}$.$0^{2,10}$.$0^{12,21}$.$0^{14,19}$)-5-pentacosene,
derivatives of pentacyclo(8.4.0.$1^{2,5}$.$1^{9,12}$.$0^{8,13}$)-3-hexadecene,
derivatives of heptacyclo(8.8.0.$1^{4,7}$.$1^{11,18}$.$1^{13,16}$.$0^{3,8.012,17}$)-5-heneicosene,
derivatives of nonacyclo(10.10.1.$1^{5,8}$.$1^{14,21}$.$1^{16,19}$.$0^{2,11}$.$0^{4,9}$.$0^{13,22}$.$0^{15,20}$)-5-hexacosene,
derivatives of 1,4-methano-1,4,4a,9a-tetrahydrofluorene,
derivatives of 1,4-methano-1,4,4a,5,10,10a-hexahydroanthracene and
cyclopentadiene-acenaphthylene adducts.

More specific examples of the cycloolefins represented by the general formulae (1) and (2) are given below.

Derivatives of bicyclo[2.2.1]hept-2-ene, such as:

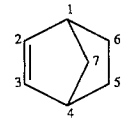

bicyclo(2.2.1)hept-2-ene

6-methylbicyclo(2.2.1)hept-2-ene

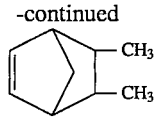

5,6-dimethylbicyclo(2.2.1)-hept-2-ene

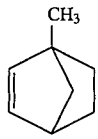

1-methylbicyclo(2.2.1)hept-2-ene

6-ethylbicyclo(2.2.1)hept-2-ene

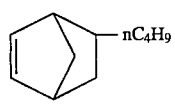

6-n-butylbicyclo(2.2.1)hept-2-ene

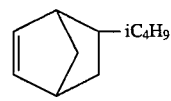

6-isobutylbicyclo(2.2.1)hept-2-ene and

7-methylbicyclo(2.2.1)hept-2-ene;

derivatives of tetracyclo(4.4.0.1$^{2,5}$.1$^{7,10}$)-3-dodecene, such as:

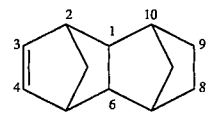

tetracyclo(4.4.0.1$^{2,5}$.1$^{7,10}$)-3-dodecene,

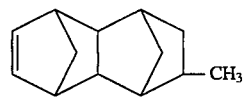

8-methyltetracyclo(4.4.0.1$^{2,5}$.1$^{7,10}$)-3-dodecene,

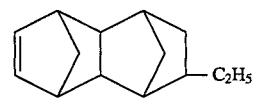

8-ethyltetracyclo(4.4.0.1$^{2,5}$.1$^{7,10}$)-3-dodecene,

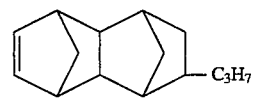

8-propyltetracyclo(4.4.0.1$^{2,5}$.1$^{7,10}$)-3-dodecene,

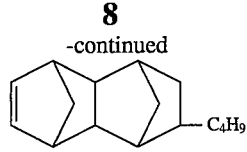

8-butyltetracyclo(4.4.0.1$^{2,5}$.1$^{7,10}$)-3-dodecene,

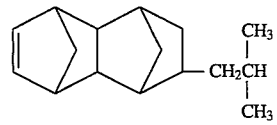

8-isobutyltetracyclo(4.4.0.1$^{2,5}$.1$^{7,10}$)-3-dodecene,

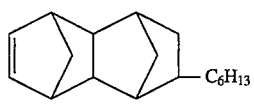

8-hexyltetracyclo(4.4.0.1$^{2,5}$.1$^{7,10}$)-3-dodecene,

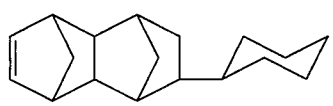

8-cyclohexyltetracyclo(4.4.0.1$^{2,5}$.1$^{7,10}$)-3-dodecene,

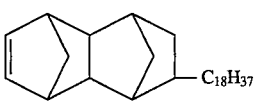

8-stearyltetracyclo(4.4.0.1$^{2,5}$.1$^{7,10}$)-3-dodecene,

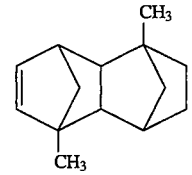

5,10-dimethyltetracyclo(4.4.0.1$^{2,5}$.1$^{7,10}$)-3-dodecene,

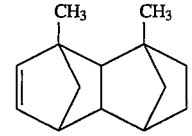

2,10-dimethyltetracyclo(4.4.0.1$^{2,5}$.1$^{7,10}$)-3-dodecene,

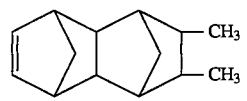

8,9-dimethyltetracyclo(4.4.0.1$^{2,5}$.1$^{7,10}$)-3-dodecene,

8-ethyl-9-methyltetracyclo(4.4.0.1$^{2,5}$.1$^{7,10}$)-3-dodecene,

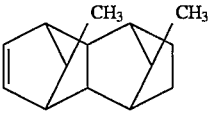

11,12-dimethyltetracyclo(4.4.0.1$^{2,5}$.1$^{7,10}$)-3-dodecene,

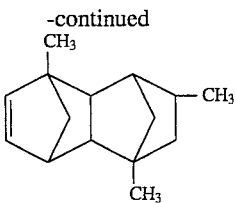

2,7,9-trimethyltetracyclo(4.4.0.1$^{2,5}$.1$^{7,10}$)-3-dodecene,

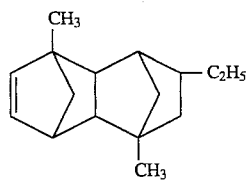

9-ethyl-2,7-dimethyltetracyclo(4.4.0.1$^{2,5}$.1$^{7,10}$)-3-dodecene,

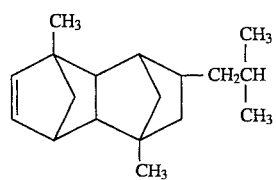

9-isobutyl-2,7-dimethyltetracyclo(4.4.0.1$^{2,5}$.1$^{7,10}$)-3-dodecene,

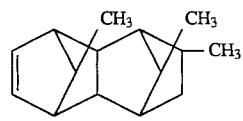

9,11,12-trimethyltetracyclo(4.4.0.1$^{2,5}$.1$^{7,10}$)-3-dodecene,

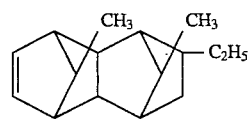

9-ethyl-11,12-dimethyltetracyclo(4.4.0.1$^{2,5}$.1$^{7,10}$)-3-dodecene,

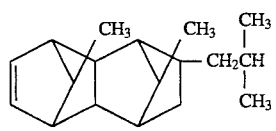

9-isobutyl-11,12-dimethyltetracyclo(4.4.0.1$^{2,5}$.1$^{7,10}$)-3-dodecene,

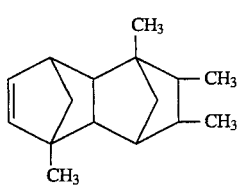

5,8,9,10-tetramethyltetracyclo(4.4.0.1$^{2,5}$.1$^{7,10}$)-3-dodecene,

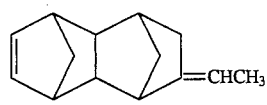

8-ethylidenetetracyclo(4.4.0.1$^{2,5}$.1$^{7,10}$)-3-dodecene,

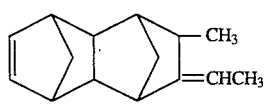

8-ethylidene-9-methyltetracyclo(4.4.0.1$^{2,5}$.1$^{7,10}$)-3-dodecene,

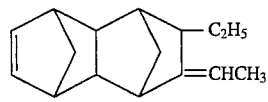

8-ethylidene-9-ethyltetracyclo(4.4.0.1$^{2,5}$.1$^{7,10}$)-3-dodecene,

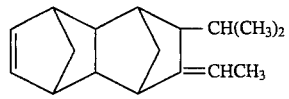

8-ethylidene-9-isopropyltetracyclo(4.4.0.1$^{2,5}$.1$^{7,10}$)-3-dodecene,

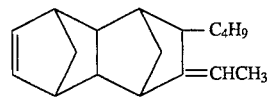

8-ethylidene-9-butyltetracyclo(4.4.0.1$^{2,5}$.1$^{7,10}$)-3-dodecene,

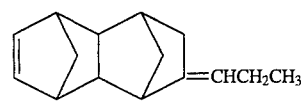

8-n-propylidenetetracyclo(4.4.0.1$^{2,5}$.1$^{7,10}$)-3-dodecene,

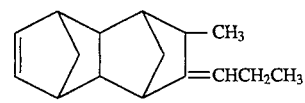

8-n-propylidene-9-methyltetracyclo(4.4.0.1$^{2,5}$.1$^{7,10}$)-3-dodecene,

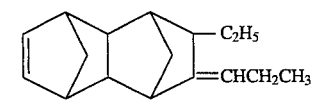

8-n-propylidene-9-ethyltetracyclo(4.4.0.1$^{2,5}$.1$^{7,10}$)-3-dodecene,

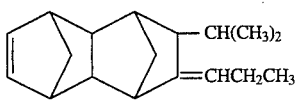

8-n-propylidene-9-isopropyltetracyclo(4.4.0.1$^{2,5}$.1$^{7,10}$)-3-dodecene,

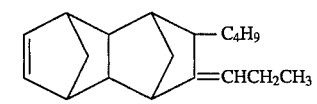

8-n-propylidene-9-butyltetracyclo(4.4.0.1$^{2,5}$.1$^{7,10}$)-3-dodecene,

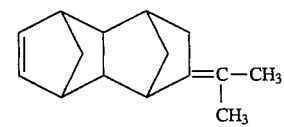

8-isopropylidenetetracyclo(4.4.0.1$^{2,5}$.1$^{7,10}$)-3-dodecene,

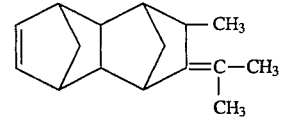

8-isopropylidene-9-methyltetracyclo(4.4.0.1$^{2,5}$.1$^{7,10}$)-3-dodecene,

11
-continued

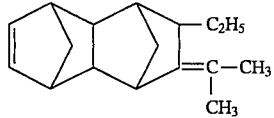

8-isopropylidene-9-ethyltetracyclo(4.4.0.1$^{2,5}$.1$^{7,10}$)-3-dodecene,

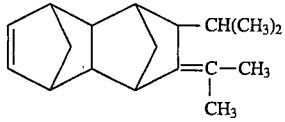

8-isopropylidene-9-isopropyltetracyclo(4.4.0.1$^{2,5}$.1$^{7,10}$)-3-dodecene,

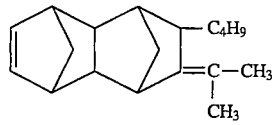

8-isopropylidene-9-butyltetracyclo(4.4.0.1$^{2,5}$.1$^{7,10}$)-3-dodecene,

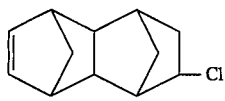

8-chlorotetracyclo(4.4.0.1$^{2,5}$.1$^{7,10}$)-3-dodecene,

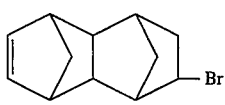

8-bromotetracyclo(4.4.0.1$^{2,5}$.1$^{7,10}$)-3-dodecene,

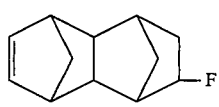

8-fluolotetracyclo(4.4.0.1$^{2,5}$.1$^{7,10}$)-3-dodecene, and

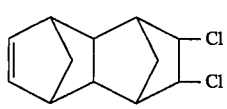

8,9-dichlorotetracyclo(4.4.0.1$^{2,5}$.1$^{7,10}$)-3-dodecene, derivatives of hexacyclo(6.6.1.1$^{3,6}$.1$^{10,13}$.0$^{2,7}$.0$^{9,14}$)-4-heptadecene, such as:

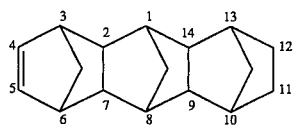

hexacyclo(6.6.1.1$^{3,6}$.1$^{10,13}$.0$^{2,7}$.0$^{9,14}$)-4-heptadecene,

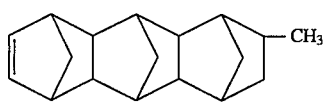

12-methylhexacyclo(6.6.1.1$^{3,6}$.1$^{10,13}$.0$^{2,7}$.0$^{9,14}$)-4-heptadecene,

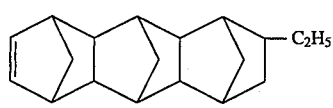

12-ethylhexacyclo(6.6.1.1$^{3,6}$.1$^{10,13}$.0$^{2,7}$.0$^{9,14}$)-4-heptadecene,

12
-continued

12-isobutylhexacyclo(6.6.1.1$^{3,6}$.1$^{10,13}$.0$^{2,7}$.0$^{9,14}$)-4-heptadecene and

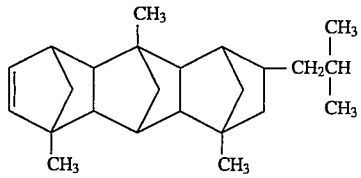

1,6,10-trimethyl-12-isobutylhexacyclo(6.6.1.1$^{3,6}$.1$^{10,13}$.0$^{2,7}$.0$^{9,14}$)-4-heptadecene;

derivatives of octacyclo(8.8.0.1$^{2,9}$.1$^{4,7}$.1$^{11,18}$.1$^{13,16}$.0$^{3,8}$.0$^{12,17}$)-5-docosene, such as:

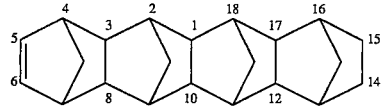

octacyclo(8.8.0.1$^{2,9}$.1$^{4,7}$.1$^{11,18}$.1$^{13,16}$.0$^{3,8}$.0$^{12,17}$)-5-docosene,

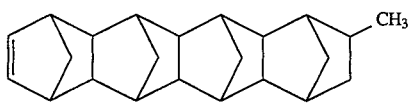

15-methyloctacyclo(8.8.0.1$^{2,9}$.1$^{4,7}$.1$^{11,18}$.1$^{13,16}$.0$^{3,8}$.0$^{12,17}$)-5-docosene, and

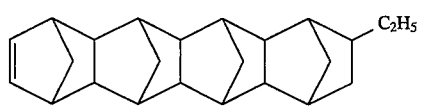

15-ethyloctacyclo(8.8.0.1$^{2,9}$.1$^{4,7}$.1$^{11,18}$.1$^{13,16}$.0$^{3,8}$.0$^{12,17}$)-5-docosene;

derivatives of pentacyclo(6.6.1.1$^{3,6}$.0$^{2,7}$.0$^{9,14}$)-4-hexadecene, such as:

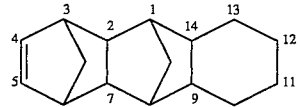

pentacyclo(6.6.1.1$^{3,6}$.0$^{2,7}$.0$^{9,14}$)-4-hexadecene

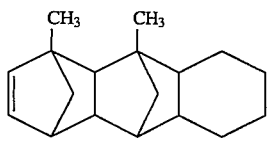

1,3-dimethylpentacyclo(6.6.1.1$^{3,6}$.0$^{2,7}$.0$^{9,14}$)-4-hexadecene,

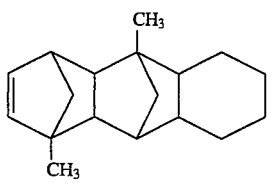

1,6-dimethylpentacyclo(6.6.1.1$^{3,6}$.0$^{2,7}$.0$^{9,14}$)-4-hexadecene,

-continued

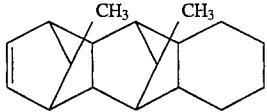

15,16-dimethylpentacyclo(6.6.1.1$^{3,6}$.0$^{2,7}$.0$^{9,14}$)-4-hexadecene;

derivatives of heptacyclo-5-eicosene or of heptacyclo-5-heneicosene, such as:

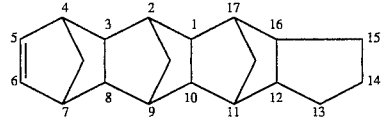

heptacyclo(8.7.0.1$^{2,9}$.1$^{4,7}$.1$^{11,17}$.0$^{3,8}$.0$^{12,16}$)-5-eicosene and

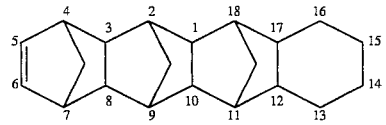

heptacyclo(8.8.0.1$^{2,9}$.1$^{4,7}$.1$^{11,18}$.0$^{3,8}$.0$^{12,17}$)-5-heneicosene;

derivatives of tricyclo(4.3.0.1$^{2,5}$)-3-decene, such as:

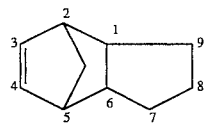

tricyclo(4.3.0.1$^{2,5}$)-3-decene,

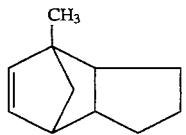

2-methyl-tricyclo(4.3.0.1$^{2,5}$)-3-decene and

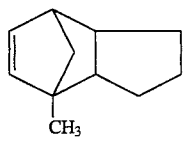

5-methyl-tricyclo(4.3.0.1$^{2,5}$)-3-decene;

derivatives of tricyclo(4.4.0.1$^{2,5}$)-3-undecene, such as:;

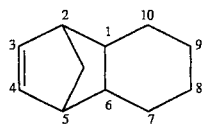

tricyclo(4.4.0.1$^{2,5}$)-3-undecene and

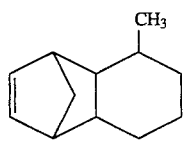

10-methyl-tricyclo(4.4.0.1$^{2,5}$)-3-undecene;

derivatives of pentacyclo(6.5.1.1$^{3,6}$.0$^{2,7}$.0$^{9,13}$)-4-pentadecene, such as:

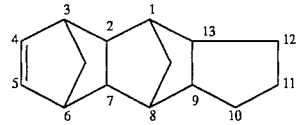

pentacyclo(6.5.1.1$^{3,6}$.0$^{2,7}$.0$^{9,13}$)-4-pentadecene,

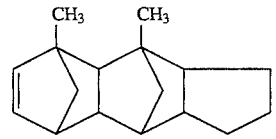

1,3-dimethyl-pentacyclo(6.5.1.1$^{3,6}$.0$^{2,7}$.0$^{9,13}$)-4-pentadecene,

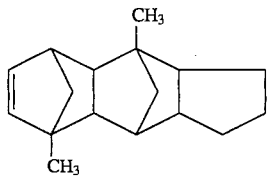

1,6-dimethyl-pentacyclo(6.5.1.1$^{3,6}$.0$^{2,7}$.0$^{9,13}$)-4-pentadecene and

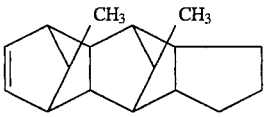

14,15-dimethyl-pentacyclo(6.5.1.1$^{3,6}$.0$^{2,7}$.0$^{9,13}$)-4-pentadecene;

diene compounds, such as:

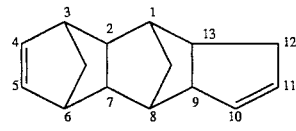

pentacyclo(6.5.1.1$^{3,6}$.0$^{2,7}$.0$^{9,13}$)-4,10-pentadecadiene;

derivatives of pentacyclo(7.4.0.1$^{2,5}$.1$^{9,12}$.0$^{8,13}$)-3-pentadecene, such as:

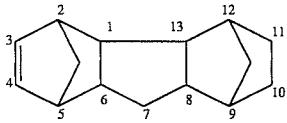

pentacyclo(7.4.0.1$^{2,5}$.1$^{9,12}$.0$^{8,13}$)-3-pentadecene and

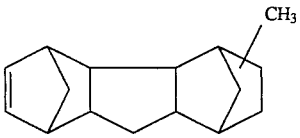

methyl-substituted pentacyclo(7.4.0.1$^{2,5}$.1$^{9,12}$.0$^{8,13}$)-3-pentadecene;

derivatives of heptacyclo(8.7.0.1$^{3,6}$.1$^{10,17}$.1$^{12,15}$.0$^{2,7}$.0$^{11,16}$)-4-eicosene, such as:

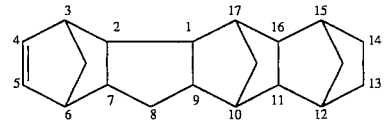

heptacyclo(8.7.0.1$^{3,6}$.1$^{10,17}$.1$^{12,15}$.0$^{2,7}$.0$^{11,16}$)-4-eicosene and

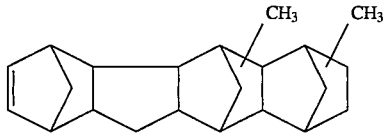

dimethyl-substituted heptacyclo(8.7.0.1$^{3,6}$.1$^{10,17}$.1$^{12,15}$.0$^{2,7}$.0$^{11,16}$)-4-eicosene;

derivatives of nonacyclo (10.9.1.1$^{4,7}$.1$^{13,20}$.1$^{15,18}$.0$^{3,8}$.0$^{2,10}$.0$^{12,21}$.0$^{14,19}$)-5-pentacosene, such as:

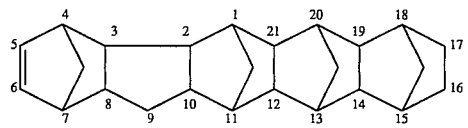

nonacyclo(10.9.1.1$^{4,7}$.1$^{13,20}$.1$^{15,18}$.0$^{3,8}$.0$^{2,10}$.0$^{12,21}$.0$^{14,19}$)-5-pentacosene and

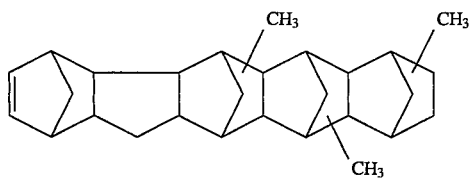

trimethyl-substituted nonacyclo (10.9.1.1$^{4,7}$.1$^{13,20}$.1$^{15,18}$.0$^{3,8}$.0$^{2,10}$.0$^{12,21}$.0$^{14,19}$)-5-pentacosene;

derivatives of pentacyclo(8.4.0.1$^{2,5}$.1$^{9,12}$.0$^{8,13}$)-3-hexadecene, such as:

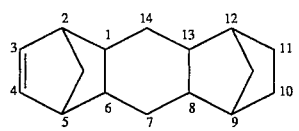

pentacyclo(8.4.0.1$^{2,5}$.1$^{9,12}$.0$^{8,13}$)-3-hexadecene,

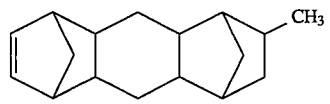

11-methyl-pentacyclo(8.4.0.1$^{2,5}$.1$^{9,12}$.0$^{8,13}$)-3-hexadecene,

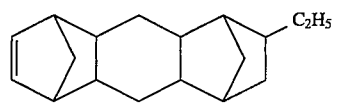

11-ethyl-pentacyclo(8.4.0.1$^{2,5}$.1$^{9,12}$.0$^{8,13}$)-3-hexadecene and

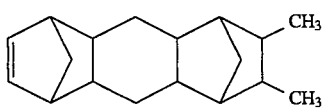

10,11-dimethyl-pentacyclo(8.4.0.1$^{2,5}$.1$^{9,12}$.0$^{8,13}$)-3-hexadecene;

derivatives of heptacyclo (8.8.0.1$^{4,7}$.1$^{11,18}$.1$^{13,16}$.0$^{3,8}$.0$^{12,17}$)-5-heneicosene, such as:

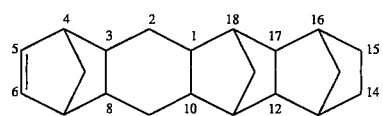

heptacyclo(8.8.0.1$^{4,7}$.1$^{11,18}$.1$^{13,16}$.0$^{3,8}$.0$^{12,17}$)-5-heneicosene,

15-methyl-heptacyclo(8.8.0.1$^{4,7}$.1$^{11,18}$.1$^{13,16}$.0$^{3,8}$.0$^{12,17}$)-5-heneicosene and

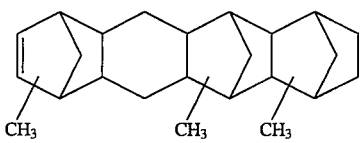

trimethyl-heptacyclo(8.8.0.1$^{4,7}$.1$^{11,18}$.1$^{13,16}$.0$^{3,8}$.0$^{12,17}$)-5-heneicosene;

derivatives of nonacyclo (10.10.1.1$^{5,8}$.1$^{14,21}$.1$^{16,19}$.0$^{2,11}$.0$^{4,9}$.0$^{13,22}$.0$^{15,20}$)-6-hexacosene, such as:

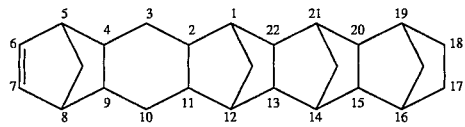

nonacyclo(10.10.1.1$^{5,8}$.1$^{14,21}$.1$^{16,19}$.0$^{2,11}$.0$^{4,9}$.0$^{13,22}$.0$^{15,20}$)-6-hexacosene;

and miscellaneous other compounds, such as:

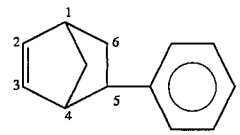

5-phenyl-bicyclo(2.2.1)hept-2-ene,

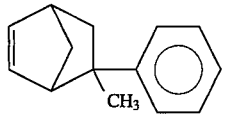

5-methyl-5-phenyl-bicyclo(2.2.1)hept-2-ene,

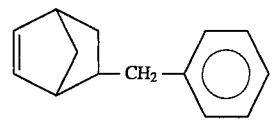

5-benzyl-bicyclo(2.2.1)hept-2-ene,

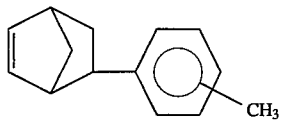

5-tolyl-bicyclo(2.2.1)hept-2-ene,

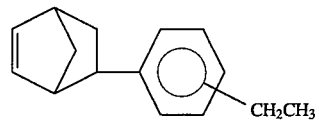

5-(ethylphenyl)-bicyclo(2.2.1)hept-2-ene,

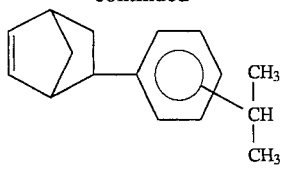

5-(isopropylphenyl)-bicyclo(2.2.1)hept-2-ene,

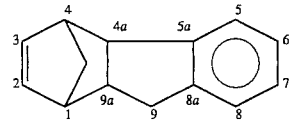

1,4-methano-1,4,4a,9a-tetrahydrofluorene,

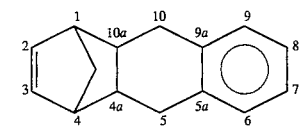

1,4-methano-1,4,4a,5,10,10a-hexahydroanthracene,

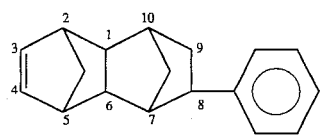

8-phenyl-tetracyclo(4.4.0.1$^{2,5}$.1$^{7,10}$)-3-dodecene,

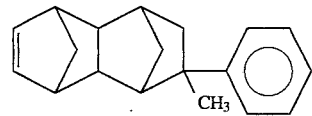

8-methyl-8-phenyl-tetracyclo(4.4.0.1$^{2,5}$.1$^{7,10}$)-3-dodecene,

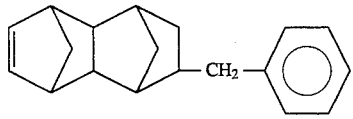

8-benzyl-tetracyclo(4.4.0.1$^{2,5}$.1$^{7,10}$)-3-dodecene,

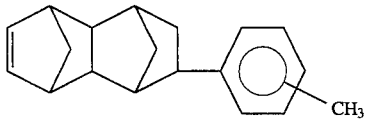

8-tolyl-tetracyclo(4.4.0.1$^{2,5}$.1$^{7,10}$)-3-dodecene,

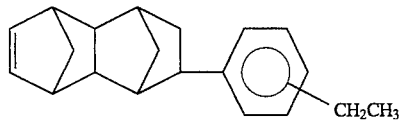

8-(ethylphenyl)-tetracyclo(4.4.0.1$^{2,5}$.1$^{7,10}$)-3-dodecene,

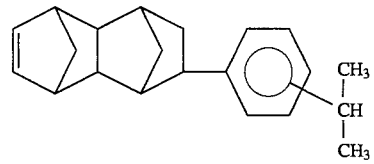

8-(isopropylphenyl)-tetracyclo(4.4.0.1$^{2,5}$.1$^{7,10}$)-3-dodecene,

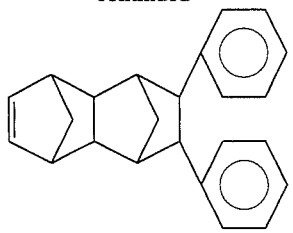

8,9-diphenyl-tetracyclo(4.4.0.1$^{2,5}$.1$^{7,10}$)-3-dodecene,

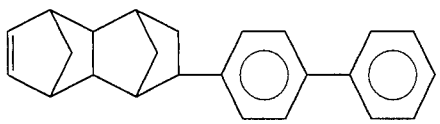

8-(biphenyl)-tetracyclo(4.4.0.1$^{2,5}$.1$^{7,10}$)-3-dodecene,

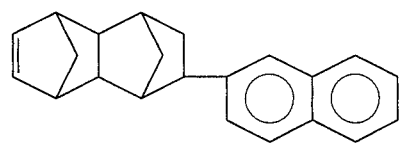

8-(β-naphthyl)-tetracyclo(4.4.0.1$^{2,5}$.1$^{7,10}$)-3-dodecene,

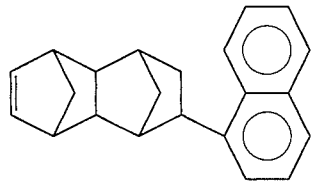

8-(α-naphthyl)-tetracyclo(4.4.0.1$^{2,5}$.1$^{7,10}$)-3-dodecene,

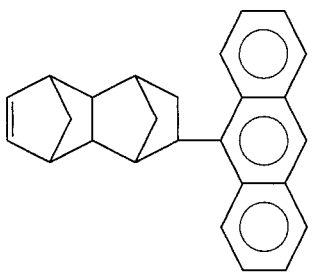

8-(anthracenyl)-tetracyclo(4.4.0.1$^{2,5}$.1$^{7,10}$)-3-dodecene,

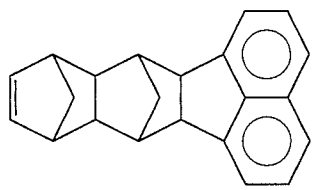

addition product of cyclopentadiene to cyclopentadiene-acenaphthylene adduct,

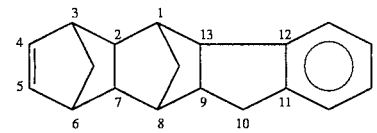

11,12-benzo-pentacyclo(6.5.1.1$^{3,6}$.0$^{2,7}$.0$^{9,13}$)-4-pentadecene,

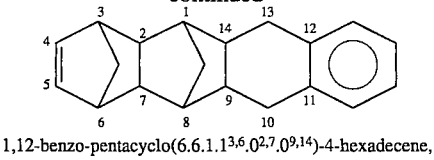

11,12-benzo-pentacyclo(6.6.1.1$^{3,6}$.0$^{2,7}$.0$^{9,14}$)-4-hexadecene,

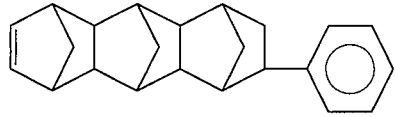

11-phenyl-hexacyclo(6.6.1.1$^{3,6}$.1$^{10,13}$.0$^{2,7}$.0$^{9,14}$)-4-heptadecene,

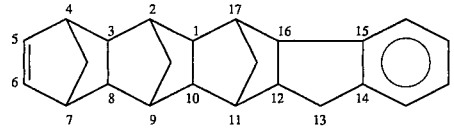

14,15-benzo-heptacyclo(8.7.0.1$^{2,9}$.1$^{4,7}$.1$^{11,17}$.0$^{3,8}$.0$^{12,16}$)-5-eicosene,

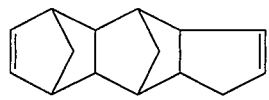

pentacyclo(6.5.1.1$^{3,6}$.0$^{2,7}$.0$^{9,13}$)-4,11-pentadecadiene,

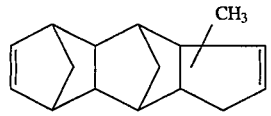

methyl-substituted pentacyclo(6.5.1.1$^{3,6}$.0$^{2,7}$.0$^{9,13}$)-4,11-pentadecadiene,

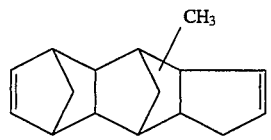

methyl-substituted pentacyclo(6.5.1.1$^{3,6}$.0$^{2,7}$.0$^{9,13}$)-4,11-pentadecadiene,

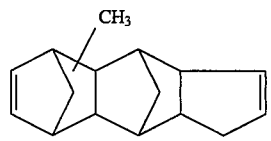

methyl-substituted pentacyclo(6.5.1.1$^{3,6}$.0$^{2,7}$.0$^{9,13}$)-4,11-pentadecadiene,

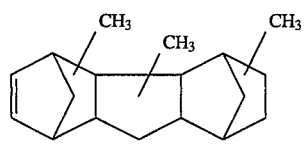

trimethyl-substituted pentacyclo(4.7.0.1$^{2,5}$.0$^{8,13}$.1$^{9,12}$)-3-pentadecene,

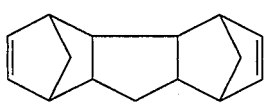

pentacyclo(4.7.0.1$^{2,5}$.0$^{8,13}$.1$^{9,12}$)-3,10-pentadecadiene,

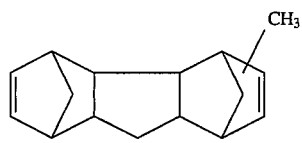

methyl-substituted pentacyclo(4.7.0.1$^{2,5}$.0$^{8,13}$.1$^{9,12}$)-3,10-pentadecadiene,

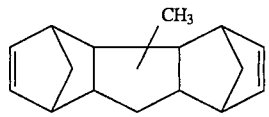

methyl-substituted pentacyclo(4.7.0.1$^{2,5}$.0$^{8,13}$.1$^{9,12}$)-3,10-pentadecadiene,

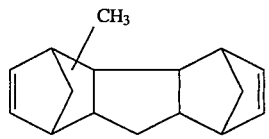

methyl-substituted pentacyclo(4.7.0.1$^{2,5}$.0$^{8,13}$.1$^{9,12}$)-3,10-pentadecadiene,

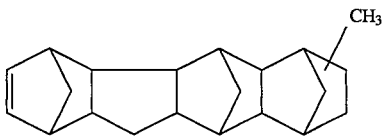

methyl-substituted heptacyclo(7.8.0.1$^{3,6}$.0$^{2,7}$.1$^{10,17}$.0$^{11,16}$.1$^{12,15}$)-4-eicosene,

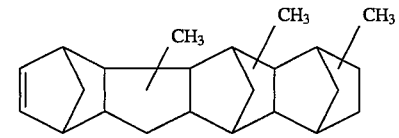

trimethyl-substituted heptacyclo(7.8.0.1$^{3,6}$.0$^{2,7}$.1$^{10,17}$.0$^{11,16}$.1$^{12,15}$)-4-eicosene,

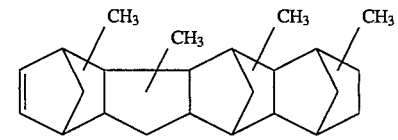

tetramethyl-substituted heptacyclo(7.8.0.1$^{3,6}$.0$^{2,7}$.1$^{10,17}$.0$^{11,16}$.1$^{12,15}$)-4-eicosene,

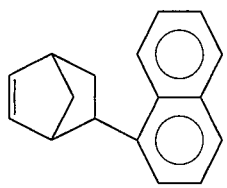

5-(α-naphthyl)bicyclo(2.2.1)hept-2-ene

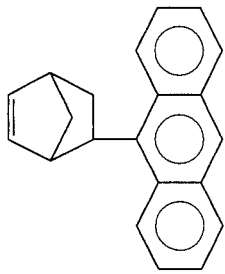

5-(anthracenyl)bicyclo(2.2.1)hept-2-ene

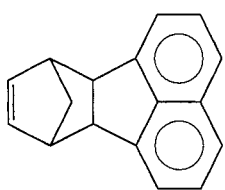

cyclopentadiene-acenaphthylene adduct,

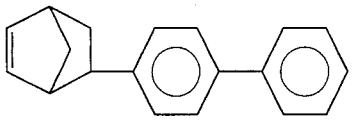

5-(biphenyl)-bicyclo(2.2.1)hept-2-ene

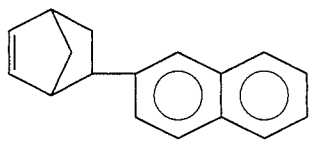

5-(β-naphthyl)-bicyclo(2.2.1)hept-2-ene

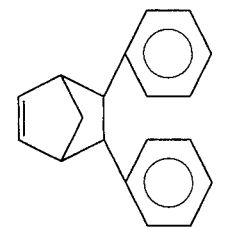

5,6-diphenyl-bicyclo(2.2.1)hept-2-ene

The cycloolefins represented by the general formulas (1) and (2) can be produced by subjecting cyclopentadiene and an olefin compound of corresponding molecular structure to Diels-Alder reaction.

These cycloolefins can be employed solely or in combination of two or more of them.

The cycloolefin-based resins (a-1)–(a-3) to be employed according to the present invention can be produced using a cycloolefin represented by the above formula (1) or (2) in accordance with the processes proposed by the applicants in, for example, Japanese Patent Application Kokai Nos. 168708/1985, 120816/1986, 115912/1986, 115916/1986, 271308/1986, 272216/1986, 252406/1987, 252407/1987, 000105/1989, 156308/1989 and 197511/1989 by selecting the conditions adequately.

The Ethylene/Cycloolefin Random Copolymer (a-1)

The ethylene/cycloolefin random copolymer (a-1) to be used as the cycloolefin-based resin (A1) contains usually the constituent unit derived from ethylene in an amount of 52–90 mole %, preferably 55–80 mole %, and the constituent unit derived from a cycloolefin in an amount of 10–48 mole %, preferably 20–45 mole %. The composition of ethylene and the composition of cycloolefin are determined using $^{13}$C-NMR.

In this ethylene/cycloolefin random copolymer (a-1), the constituent units derived from ethylene and the constituent units derived from a cycloolefin are combined in a random distribution and substantially in a linear structure. The assumption that this copolymer is substantially linear and does not substantially contain a cross-linked gelled molecular structure can be ascertained by the fact that this copolymer dissolves in an organic solvent without exhibiting any insoluble matter. For example, this can be ascertained, as will be described below, by the fact that this copolymer dissolves completely in decalin at 135° C. upon the determination of its intrinsic viscosity (η).

In the ethylene/cycloolefin random copolymer (a-1) to be used according to the present invention, at least a part of the constituent unit derived from a cycloolefin of the formula (1) or (2) is represented by the following structural formulae (1-a) or (2-a) respectively. Here, it is believed that at least a part of the cycloolefin represented by the subformula (1-1) of formula (1) has a structure represented by the structural formula (1-1-a):

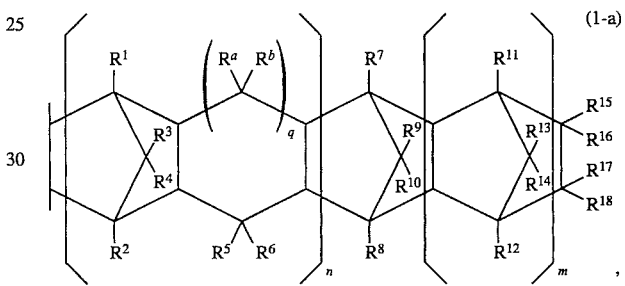

(1-a)

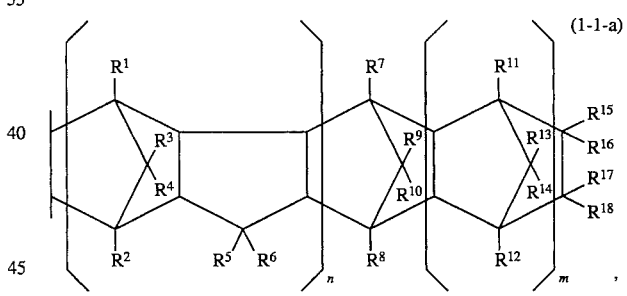

(1-1-a)

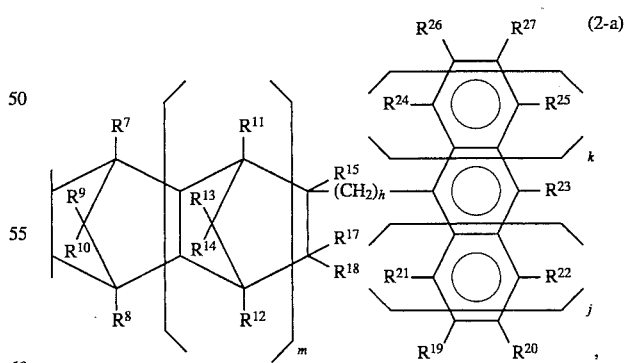

(2-a)

wherein n, m, q, $R^1$–$R^{18}$ and $R^a$ and $R^b$ in the general formulae (1-a) and (1-1-a) have the same meanings as those in the general formula (1) and m, h, j, k, $R^7$–$R^{15}$ and $R^{17}$–$R^{27}$ in the general formula (2-a) have the same meanings as those in the general formula (2).

The ethylene/cycloolefin random copolymer (a-1) to be employed according to the present invention may contain, if necessary, constituent units derived from other copolymerizable monomers within the extent not obstructing the purpose of the present invention.

For such other comonomers, there may be enumerated, for-example, other olefins than ethylene and the above-mentioned cycloolefins, norbornenes, non-conjugated dienes and, concretely,

- α-olefins having 3–20 carbon atoms, such as, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene;
- cycloolefins, such as, cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;
- norbornenes, such as, 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and
- non-conjugated dienes, such as, 1,4-hexadiene, 4-methyl-1,4-hexadiene, 5-methyl-1,4-hexadiene, 1,7-octadiene, dicyclopentadiene, 5-ethylidene-2-norbornene, 5-vinyl-2-norbornene.

Such other monomers can be employed solely or in combination of two or more of them.

In the ethylene/cycloolefin random copolymer (a-1), the constituent units derived from other monomers mentioned above may be contained in an amount of, usually, 20 mole % or less, preferably 10 mole % or less.

The ethylene/cycloolefin random copolymer (a-1) can be produced using ethylene and a cycloolefin represented by the formula (1) or (2) by the production processes disclosed in the patent gazettes given above. Among these, the process is preferable in which the copolymerization is carried out in a hydrocarbon solvent using a catalyst soluble therein, such as vanadium-based catalyst prepared from a vanadium compound and an organoaluminum compound, a titanium-based catalyst prepared from a titanium compound and an organoaluminum compound, or a zirconium-based catalyst composed of a zirconium complex with polydentate ligands consisting of a compound having at least two conjugated cycloalkadienyl groups bound via a lower alkylene group, on the one hand, and aluminoxane, on the other hand, to produce the ethylene/cycloolefin random copolymer (a-1).

The Cycloolefin Ring-Opening (co)Polymer (a-2)

The ring-opening polymer or the ring-opening copolymer of the cyloolefin (a-2) to be employed according to the present invention is constituted of constituent units derived from cycloolefins represented by the formula (1) or (2), wherein at least a part of these constituent units is represented by the following formulae (1-b) or (2-b). Here, it is believed that at least a part of the cycloolefin represented by the subformula (1-1) has a structure represented by the formula (1-1-b):

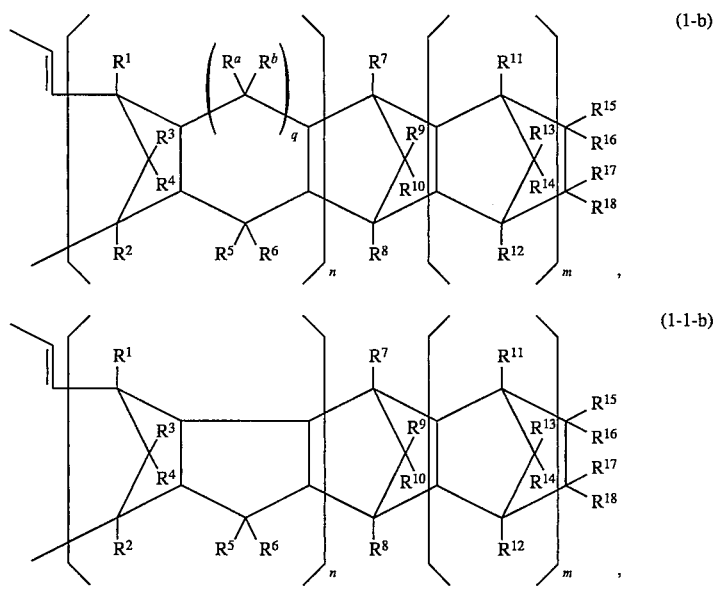

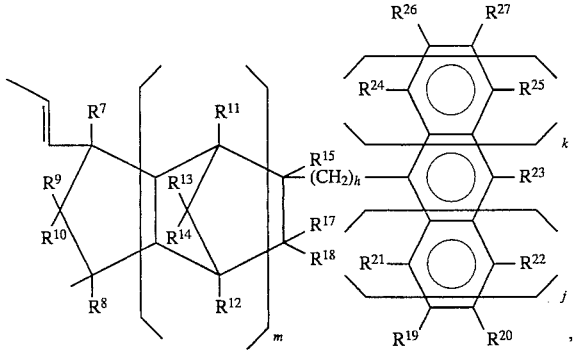

wherein the symbols n, m, q, $R^1$–$R^{18}$ and $R^a$ and $R^b$ in the formulae (1-b) and (1-1-b) have the same meanings as those in the general formula (1) and the symbols m, h, j, k, $R^7$–$R^{15}$ and $R^{17}$–$R^{27}$ in the formula (2-b) have the same meanings as those of the general formula (2).

The cycloolefin ring-opening (co)polymer (a-2) is based on, as the essential component, at least one of the above-mentioned cycloolfin monomers while it is permissible that copolymerizable unsaturated further monomer component(s) may, if necessary, be incorporated in an amount within a range not obstructing the purpose of the invention. As the copolymerizable unsaturated further monomer, there may be enumerated, for example, cycloolefin compounds represented by the following general formula (3):

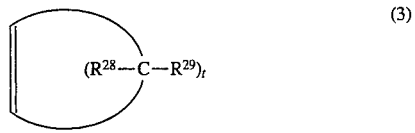

in which $R^{28}$ and $R^{29}$ represent each a hydrogen atom, a hydrocarbon group or a halogen atom, which may be identical with or different from each other, and t is an integer of 2 or higher and may be different for the cases where $R^{28}$ and $R^{29}$ are present several times repeatingly.

Specific examples of the monomer components represented by the general formula (3) include cyclobutene, cyclopentene, cyclohexene, cycloheptene, cyclooctene, cyclononene, cyclodecene, methylcyclopentene, methylcyclohexene, methylcycloheptene, methylcyclooctene, methylcyclononene, methylcyclodecene, ethylcyclopentene, ethylcyclobutene, ethylcyclooctene, dimethylcyclopentene, dimethylcyclohexene, dimethylcycloheptene, dimethylcyclooctene, trimethylcyclodecene and 2-(2-methylbutyl)-1-cyclohexene.

Concrete examples of the copolymerizable unsaturated further monomer other than those of the general formula (3) include cycloolefins, such as, 2,3,3a,7a-tetrahydro-4,7-methano-1H-indene and 3a,5,6,7a-tetrahydro-4,7-methano-1H-indene.

These copolymerizable unsaturated further monomers may be employed solely or in combination, usually in an amount less than 50 mole %, based on the total moles of the monomer units in the molecule of the cycloolefin ring-opening (co)polymer (a-2).

Such ring-opening polymer or ring-opening copolymer can be produced by the processes disclosed in the above-mentioned patent gazettes. Concretely, the production can be realized by polymerizing or copolymerizing the cycloolefin represented by the formula (1) or (2) in the presence of a ring-opening polymerization catalyst. For such ring-opening polymerization catalyst, there may be employed a catalyst composed of a combination of a halogenide, nitrate or acetylacetonate of a metal selected from, for example, ruthenium, rhodium, palladium, osmium, iridium and platinum, with a reducing agent; or a catalyst composed of a combination of a halogenide or acetylacetonate of a metal selected from, for example, titan, palladium, zirconium and molybdenum, with an organoaluminum compound.

The hydrogenation product of the ring-opening polymer or copolymer (a-2) to be employed according to the present invention is obtained by hydrogenating the above-mentioned ring-opening polymer or copolymer in the presence of a known hydrogenation catalyst.

It is believed that, in the hydrogenation product of the ring-opening polymer or copolymer (a-2), at least one of the constituent units derived from the cycloolefins represented by the general formula (1) or (2) has a structure represented by the following formula (1-c) or (2-c). Here, it is believed that at least a part of the cycloolefin represented by the subformula (1-1) has a structure represented by the formula (1-1-c):

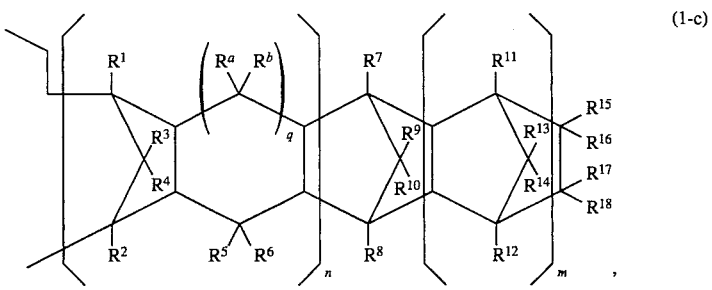

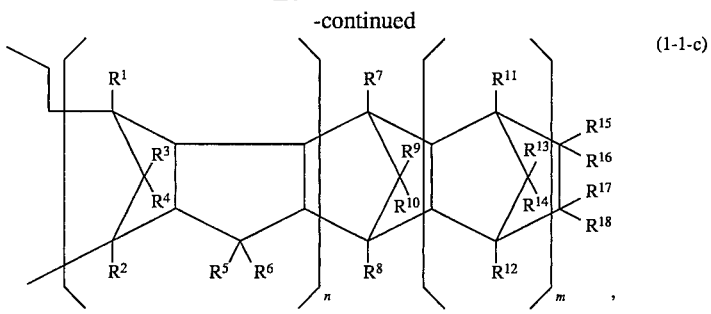

(1-1-c)

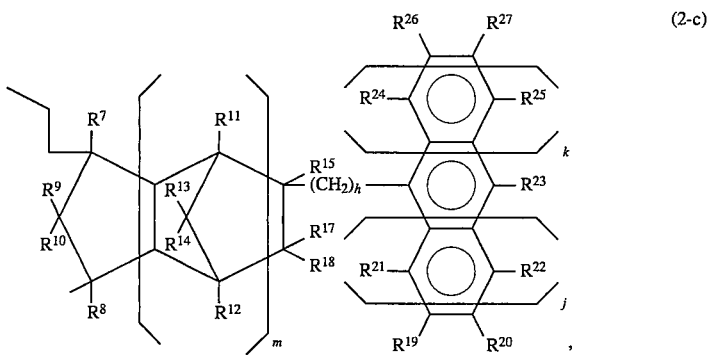

(2-c)

wherein the symbols n, m, q, $R^1$–$R^{18}$ and $R^a$ and $R^b$ in the formulae (1-c) and (1-1-c) have the same meanings as those in the general formula (1) and the symbols m, h, j, k, $R^7$–$R^{15}$ and $R^{17}$–$R^{27}$ in the formula (2-c) have the same meaning as those of the general formula (2).

The Graft-Modification Product (a-3)

The graft-modification product (a-3) of the cycloolefin-based resin to be employed according to the present invention is obtained by subjecting the ethylene/cycloolefin random copolymer (a-1) or the ring-opening (co)polymer or its hydrogenation product (a-2) partly to a graft modification with a modifying agent.

As the modifying agent, unsaturated carboxylic acids and derivatives thereof, such as acid anhydrides, for example, malic anhydride etc., and alkyl esters of these unsaturated carboxylic acids, are enumerated. In the graft-modification product to be used according to the present invention, the content of the constituent units derived from the modifying agent is, usually, 10% or less.

The graft-modification product (a-3) can be produced by admixing a modifying agent to an ethylene/cycloolefin random copolymer (a-1), to a cycloolefin ring-opening (co)polymer or its hydrogenation product (a-2) so as to reach a desired degree of modification, whereupon the mixture is subjected to a graft polymerization, or by preparing preliminarily a modification product of a higher modification degree, whereupon this product is admixed to an unmodified cycloolefin resin.

The cycloolefin resin (A1) to be employed according to the present invention is selected from the group consisting of the above-mentioned (a-1), (a-2) and (a-3), wherein a combination of two or more of these may be permitted.

Among these, ethylene/cycloolefin random copolymer (a-1) is employed preferably as the cycloolefin-based resin (A1) according to the present invention.

The polyolefin multilayer laminate according to the present invention may be composed of a first layer (A1) made of the cycloolefin-based resin and a second layer (B) made of an olefin (co)polymer or a composition containing it described afterwards, while it is permissible that the first layer is an alternative layer (A2) made of the cycloolefin-based resin composition.

Thus, the first layer (A2) of the cycloolefin-based resin composition is obtained from a resin mixture of, on the one hand, at least one cycloolefin-based resin (a), which is selected from the group consisting of an ethylene/cycloolefin random copolymer (a-1), a ring-opening (co)polymer or its hydrogenation product (a-2) and a graft-modification product (a-3), and, on the other hand, a polyolefin (b).

For the polyolefin (b), usually a (co)polymer of an α-olefin having 2–20 carbon atoms is employed.

Specifically, the α-olefins having 2–20 carbon atoms include, for example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

The polyolefin (b) to be employed according to the present invention may either be a homopolymer of such an α-olefin or a copolymer of two or more of them.

According to the present invention, it is permissible that the copolymer for the polyolefin (b) may contain other comonomer unit(s) than the α-olefin units, such as norbornenes and non-conjugated dienes, within a limit not essential to the behavior of the copolymer without obstructing the purpose of the present invention. Examples of such other comonomers include cycloolefins, such as, cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; norbornenes, such as, 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluro-2-norbornene; and non-conjugated dienes, such as, 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene. These other comonomers may be employed either solely or in combination of two or more of them.

It is particularly preferable for the present invention that the polyolefin (b) is a polyethylene and/or a polypropylene.

For the case where the polyolefin (b) is a polymer of ethylene, this may be either a homopolymer of ethylene or a copolymer of ethylene with other α-olefin.

If the polyolefin (b) is a polymer of ethylene, it may preferably be an ethylene homopolymer or a copolymer of ethylene with other α-olefin having a content of ethylene unit of at least 60 mole %, preferably at least 70 mole %, with a density of 0.830 g/cm$^3$ or higher, preferably of 0.87–0.94 g/cm$^3$, a melt flow rate at 190° C. of 0.01–100 g/10 min., preferably 0.03–50 g/10 min., and a Vicat softening point of 50°–140° C., preferably 80°–130° C.

For other α-olefins to be copolymerized with ethylene, there may be enumerated those having 3–14 carbon atoms, preferably 3–10 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

For the case where the polyolefin (b) is a polymer of propylene, this may be either a propylene homopolymer or a copolymer of propylene with other α-olefin.

If the polyolefin (b) is a polymer of propylene, it may preferably be a homopolymer or a copolymer with other α-olefin having a content of ethylene unit of at least 70 mole %, preferably at least 80 mole %, with a density of 0.85 g/cm$^3$ or higher, preferably of 0.89–0.91 g/cm$^3$, a melt flow rate at 230° C. of 0.01–100 g/10 min., preferably 0.05–50 g/10 min., and a Vicar softening point of 100°–170° C., preferably 110°–160° C.

For other α-olefins to be copolymerized with propylene, there may be enumerated those having 2–14 carbon atoms (excluding propylene), preferably 2–10 carbon atoms (excluding propylene), for example, ethylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

The polyolefin (b) may be a graft-modification product. For the modifying agent to be used here, there may be employed an unsaturated carboxylic acid, such as maleic acid, and a derivative thereof, such as an unhydride, an alkyl ester or so on.

In the case where the polyolefin (b) is a graft-modification product, the content of the constituent unit derived from the modifying agent in the polyolefin (b) may, usually, be not higher than 10 mole %.

The graft-modification product of the polyolefin can be produced by admixing a modifying agent to the polyolefin so as to reach a desired degree of modification, whereupon the mixture is subjected to a graft polymerization, or by preparing preliminarily a modification product of a higher modification degree, whereupon this product is admixed to an unmodified polyolefin.

It is permissible to blend the cycloolefin-based resin or the resin composition for the layer A to be employed according to the present invention with other components than (a-1)–(a-3) and (b), such as a rubber component, for improving the impact strength, or to blend with other components, such as other resins and various additives, for example, heat stabilizer, climate stabilizer, photostabilizer, antistatic agent, slip agent, antiblocking agent, anticlouding agent, nucleating agent, lubricant, dyestuff for absorbing a ray of specific wave length, pigment, natural petroleum, synthetic oil, wax and light-permeable filler, each in an amount within the range not obstructing the purpose of the invention.

For example, as the optionally incorporated stabilizer, there may be enumerated concretely phenolic antioxidants, such as, tetrakis[methylene-3-(3,5-di-t-butyl- 4-hydroxyphenyl)-propionate]-methane, alkyl esters of β-(3,5-di-t-butyl-4-hydroxyphenyl)-propionic acid and 2,2'-oxamide-bis[ethyl-3(3,5-di-t-butyl- 4-hydroxyphenyl)-propionate]; fatty acid metal salts, such as, zinc stearate, calcium stearate and calcium 12-hydroxy-stearate; and fatty acid esters of polyols.

These may be incorporated either solely or in combination, for example, tetrakis[methylene-3-(3,5-di-t-butyl-4-hydroxyphenyl)-propionate]-methane with zinc stearate and glycerin monostearate.

According to the present invention, preference is placed especially on the employment of a combination of a phenolic antioxidant with a fatty acid ester of polyol. For the fatty acid ester of polyol, there may be employed, for example, a partial ester of a polyol in which a part of the alcoholic hydroxyl groups of a trivalent or higher polyhydric alcohol is esterified.

Specific examples of such fatty acid esters of polyols include fatty acid esters of glycerin, such as, glycerin monostearate, glycerin monolaurate, glycerin monomyristate, glycerin monopalmitate, glycerin distearate and glycerin dilaurate; fatty acid esters of pentaerythritol, such as, pentaerythritol monostearate, pentaerythritol monolaurate, pentaerythritol distearate and pentaerythritol tristearate. These may be employed either solely or in combination with each other.

The phenolic antioxidant may preferably be employed in an amount of less than 10 parts by weight, preferably less than 5 parts by weight, more preferably less than 2 parts by weight per 100 parts by weight of the total sum of the essential components. The fatty acid ester of polyol may preferably be used in an amount of less than 10 parts by weight, preferably less than 5 parts by weight, per 100 parts by weight of the total sum of the essential components.

For preparing the cycloolefin-based resin composition for (A2) from a cycloolefin-based resin (A1) and a polyolefin (b), known mixing techniques can be employed, for example, by using a Henschel mixer, V-blender, ribbon blender, tumbler blender or the like. It is possible to subject the mixture from a mixer further to a melt kneading on a monoaxial or biaxial extruder, or on a kneader, before granulating or pelletizing and crushing the solidified product.

The Olefin (co)Polymer or the Composition Containing it for (B)

Now, the description is directed to the olefin (co)polymer or the composition containing it for the second layer B of the multilayer laminate of the present invention.

For the olefin (co)polymer for the layer B according to the present invention, usually a (co)polymer of α-olefin(s) having 2–20 carbon atoms is employed.

Specific examples of this α-olefin having 2–20 carbon atoms include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

The olefin (co)polymer to be used for (B) may be a homopolymer of such an α-olefin as above or a copolymer of two or more of such α-olefins.

It is permissible that a polar comonomer having unsaturation may be copolymerized in the olefin copolymer for (B).

As the unsaturation-containing polar comonomer to be copolymerized with the α-olefin for the olefinic (co)polymer, there may be enumerated, for example, vinyl acetate; acrylates and methacrylates having an alkyl group of $C_1$–$C_8$, preferably of $C_1$–$C_4$, such as, methyl acrylate, methyl methacrylate, ethyl acrylate, ethyl methacrylate; acrylic acid, methacrylic acid, glycidyl acrylate, glycidyl methacrylate and so on.

The olefin (co)polymer for (B) may further contain, in a copolymerized form, other comonomer components, such as those of norbornenes and non-conjugated dienes, within the limitation not obstructing the characteristic properties of the olefin copolymer.

Specific examples of such other monomer include cycloolefins, such as, cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes, such as, 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and non-conjugated dienes, such as, 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

Such other monomers can be employed solely or in combination of two or more of them.

For the present invention, it is particularly preferable that the olefin (co)polymer for (B) consists of polyethylene and/or polypropylene.

For the case where the olefin (co)polymer for (B) is an ethylene polymer, this may be either an ethylene homopolymer or a copolymer of ethylene with other α-olefin and/or with a polar monomer having unsaturation.

If the olefin (co)polymer for (B) is a polymer of ethylene, it may preferably be an ethylene homopolymer or a copolymer of ethylene with other α-olefin having a content of ethylene unit of at least 80 mole %, preferably at least 90 mole %, with a density of 0.89–0.98 $g/cm^3$, preferably of 0.90–0.94 $g/cm^3$. Such an ethylene polymer may preferably has a melt flow rate at 190° C. of 0.05–100 g/10 min., preferably 0.5–50 g/10 min., and a Vicar softening point of 70°–120° C., preferably 75°–110° C.

For other α-olefin to be copolymerized with ethylene, there may be enumerated those having 3–14 carbon atoms, preferably 3–10 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

For the case where the olefin (co)polymer for (B) is a polymer of propylene, this may be either a propylene homopolymer or a copolymer of propylene with other α-olefin and/or with a polar monomer having unsaturation.

If the olefin (co)polymer for (B) is a polymer of propylene, it may preferably be a homopolymer or a copolymer with other α-olefin having a content of propylene unit of at least 70 mole %, preferably at least 80 mole %, with a melting point (Tm) of 120°–170° C., preferably 120°–145° C., a density of 0.83 $g/cm^3$ or higher, preferably of 0.89–0.92 $g/cm^3$, a melt flow rate at 190° C. of 0.01–100 g/10 min., preferably 0.05–50 g/10 min., and a Vicat softening point of 100°–170° C., preferably 110°–160° C.

For other α-olefins to be copolymerized with propylene, there may be enumerated those having 2–14 carbon atoms (excluding propylene), preferably 2–10 carbon atoms (excluding propylene), for example, ethylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene.

The composition for the layer (B) is composed of the above olefin (co)polymer and other components, such as a rubber component, other resin component and various additives, such as heat stabilizer, climate stabilizer, photo stabilizer, antistatic agent, slip agent, antiblocking agent, anticlouding agent, nucleating agent, lubricant, dyestuff for absorbing a ray of specific wave length, pigment, natural petroleum, synthetic oil, wax and light-permeable filler, each in an amount within the range not obstructing the purpose of the invention. Compositions containing rubber component are preferable due to their improved impact strength.

For the rubber component, there may be employed, for example, a copolymer of ethylene with another α-olefin, such as, EPR (an ethylene-propylene rubber) or EBR (an ethylene-butene rubber) or a terpolymer of ethylene, diene and other α-olefin, such as EPDM (an ethylene-propylene-diene methylene linkage) or EBDM (an ethylene-butene-diene methylene linkage), though not restricted to them.

The polyolefin multilayer laminate according to the present invention is a multilayer product of sheet or film obtained by putting together, namely, laminating, a layer A of a sheet or film made of the cycloolefin-based resin or the cycloolefin-based resin composition containing, optionally, subsidiary components, with another layer B of a sheet or film made of the olefin (co)polymer or the composition containing it. Such lamination can be realized voluntarily, for example, in a lamination sequence of layer (B) of the olefin (co)polymer or its composition layer (A) of the cycloolefin-based resin or resin composition/layer (B) of the olefin (co)polymer or its composition; layer (A) of the cycloolefin-based resin or resin composition/layer (B) of the olefin (co)polymer or its composition/layer (A) of the cycloolefin-based resin or resin composition; or layer (B) of the olefin (co)polymer or its composition/layer (A) of the cycloolefin-based resin or resin composition.

In the polyolefin multilayer laminate according to the present invention, the thickness of the layer A and of the layer B can be determined suitably taking into account of the contemplated application. Usually the thickness of the layer A is in the range of 1 μm to 10 mm and that of the layer B is also in the range of 1 μm to 10 mm. The total thickness of the multilayer laminate may vary for each specific application and, usually, is in the range of 2 μm to 20 mm.

For the lamination of the layer A with the layer B, ordinary method for producing multilayer sheets and films, for example, a co-extruding molding, such as, a multilayer T-die technique, a multilayer inflation molding or an extrusion lamination; a wet or dry lamination; a multilayer blowing; a dichroic molding; a sandwich method or a stamping lamination may be adopted.

When the layer A of cycloolefin-based resin or cycloolefin-based resin composition and the layer B of olefin (co)polymer or its composition according to the present invention are laminated as such directly, the interlayer bonding strength may, in some cases, be insufficient for the contemplated application. In such cases, an adhesive third layer (denoted hereinafter as "layer C") may be interposed between the two layers for improving the interlayer bonding strength.

For such an adhesive material for the layer C, a copolymeric resin of low- or non-crystalline soft consistency or a resin composition containing such a copolymeric resin may preferably be employed in accordance with the present invention.

For such a low- or non-crystalline soft copolymeric resin, an adhesive resin composition containing a modified polyolefin or a unsaturated polyolefin may be employed. Such a modified polyolefin may be prepared from an ethylene/α-olefin random copolymer having a melt flow rate (MFR) of, usually, 0.1–50 g/10 min., preferably 0.2–20 g/10 min., as determined according to ASTM D1238L, a density of, usually, 0.850–0.900 g/cm$^3$, preferably 0.855–0.895 g/cm$^3$, an ethylene unit content of 30–95 mole %, preferably 40–92 mole %, and a degree of crystallinity of, usually, not higher than 40%, preferably not higher than 30%, as determined by X-ray diffraction method.

For the α-olefin for producing such an ethylene/α-olefin random copolymer, usually those which have 3–20 carbon atoms are employed. Examples of such α-olefin include propylene, 1-butene, 1-hexene, 4-methyl-1-pentene, 1-octene, 1-decene, 1-tetradecene and 1-octadecene. These α-olefins may be used alone or in a suitable combination.

These ethylene/α-olefin copolymers are of low- or non-crystalline nature and have melting points of, usually, not higher than 100° C., as determined according to ASTM D 3418.

According to the present invention, the soft low- or non-crystalline copolymer mentioned above can be used alone, while it is possible to admix thereto a tackifying substance to formulate an adhesive mixture.

Thus, the low- or non-crystalline soft copolymeric resin may be used as a blend with one or more aliphatic hydrocarbon resins and/or one or more alicyclic hydrocarbon resins obtained by hydrogenation of corresponding aromatic hydrocarbons. These aliphatic and/or alicyclic resins and resin mixtures may serve as tackifier and exhibit better compatibility with the low- or non-crystalline soft copolymeric resin mentioned above, since they have no polar moiety in the molecule. It is in particular preferable to use an alicyclic hydrocarbon resin having a softening point of 105°–150° C., preferably 110°–140° C., as determined by the ring-ball method, and a hydrogenation yield of 80% or higher, preferably 85% or higher. When the soft copolymeric resin is used as the blend for the adhesive, the weight proportion of the ethylene/α-olefin copolymer to the aliphatic and/or alicyclic hydrocarbon resins may be in the range of 60–98:2–40.

The low- or non-crystalline soft copolymeric resin may be modified partly or entirely with an unsaturated carboxylic acid or a derivative thereof or, it is possible to blend the soft copolymeric resin with a modified polyethylene. The modified polyethylene may have 0.01–10% by weight, preferably 0.1–5% by weight, of an unsaturated carboxylic acid moiety grafted thereon, a density of 0.920–0.98 g/cm$^3$, preferably 0.905–0.970 g/cm$^3$, and a degree of crystallinity of at least 45%, preferably in the range of 50–80%, as determined by X-ray diffraction method. For such a modified polyethylene, an ethylene homopolymer having a melt flow rate (MFR; determine by ASTM D 1283, E) of 0.001–100 g/10 min., a density of 0.905–0.980 g/cm$^3$ and a degree of crystallinity of at least 45% may be employed. It is also possible to use a copolymer of ethylene with other α-olefin. Such an α-olefin to be copolymerized with ethylene includes propylene, 1-butene, 4-methyl-1-pentene, 1-hexene, 1-octene and 1-decene.

As the unsaturated carboxylic acid or the derivative thereof to be grafted onto the soft copolymeric resin mentioned above for modifying it, an unsaturated carboxylic acid, such as, acrylic acid, maleic acid, fumaric acid, tetrahydrophthalic acid, itaconic acid, citraconic acid, crotonic acid, isocrotonic acid, Nadic acid (trademark; endocisbicyclo( 2.2.1)hept-5-ene-2,3-dicarboxylic acid) and the like and derivatived therof, such as an acid halide, amide, imide, acid anhydride and ester, may be used. Concrete examples include maleyl hydrochloride, maleimide, maleic anhydride, citraconic anhydride, monomethyl maleate, dimethyl maleate and glycidyl maleate. Among them, unsaturated dicarboxylic acids and their anhydrides are preferable and, in particular, maleic acid and Nadic acid as well as their anhydrides are most preferred. The modification of polyethylene by grafting these grafting agents thereon can be carried out according to any of the conventional methods.

For the case of using a blend of the soft copolymeric resin with the modified polyethylene, such a blend may usually contain the modified polyethylene usually in an amount of 0.1–50%, based on the weight of the low- or non-crystalline soft copolymeric resin.

The soft copolymeric resin blend may comprise a mixture of the ethylene/α-olefin random copolymer with an ethylene/vinyl acetate random copolymer and/or ethylene/vinyl alcohol random copolymer. The content of the ethylene/α-olefin random copolymer in the blend may be 60–98% by weight and the content of the ethylene/vinyl acetate random copolymer and/or the ethylene/vinyl alcohol random copolymer may amount to 2–40% by weight.

By using the low- or non-crystalline soft copolymeric resin or the blend thereof for the layer C as the interposed third layer, the layer A made of the cycloolefin-based resin or the composition thereof can be bonded firmly with the layer B made of the olefin (co)polymer or the composition containing it.

For preparing such a multilayer laminate according to the present invention, various techniques including co-extrusion techniques, such as multilayer T-die extrusion, multilayer inflation molding and extrusion lamination; generally employed multilayer film production techniques, such as wet lamination, dry lamination and press molding; blow molding techniques, such as co-injection blow molding; injection molding techniques, such as sandwich injection and dichroic injection; and stamping lamination may be employed. The polyolefin multilayer laminate according to the present invention obtained as above can be brought into practical use as such or after having been subjected to a monoaxial or a biaxial stretching. It is also possible to apply thereon or to laminate therewith a further layer(s) of polyvinylidene chloride, polyamide, copolymer of ethylene with vinyl alcohol, polyester or so on to impart to the laminate further functional property.

The polyolefin multilayer laminate according to the present invention is excellent in the interlayer adhesion, moistureproof property, transparency, adequate flexibility, easy hand-cutting, heat sealing property and dead-hold property as well as in the processibility by vacuum or pneumatic shaping, so that it reveals a satisfactory performance as a material for packaging drugs, foods and cigerettes. Thus, the polyolefin multilayer laminate according to the present invention can be utilized adaptively as a packaging sheet or film and as vessels, such as bottles, containers and the like.

As the articles to be packaged therewith, every voluntary articles, such as, drugs, food products, household commodities and miscellaneous goods, may be enumerated. When the laminate is employed for packaging, in particular, pelletized and encapsulated drugs, food products, such as rice cookies, snacks and cookies, moisture-absorbable articles such as cigarettes, tea bags etc., the moistureproof property and transparency are guaranteed.

Packaging may be effected in a form of filmy packages such as bags, packs, PTPs (press through packs), blister packs, hand-foldings, wrappings and shrink and easy peel package; easily assembled vessels such as tetrapack and milk pack; shaped medical containers such as vials, medical bottles, transfusion bottles and syringe tubes; vessels for laboratory use such as shells, test tubes and analytical cells; and cosmetic containers.

The polyolefin multilayer laminate according to the present invention is particularly suitable as the material for vessels for vials, eyedropper etc., for PTP or blister pack and for wrapping film for food products.

As described above, according to the present invention, a polyolefin multilayer laminate highly adapted for packaging material is obtained, which is excellent in the interlayer adhesion, formability, moistureproof property, mechanical strength, resistance to chemicals, transparency, adequate flexibility, easy hand-cutting, heat sealability and dead-hold property, together with a superior processability by vacuum or pneumatic forming.

PREFERRED EMBODIMENTS OF THE INVENTION

Below, the present invention is further described in detail by way of specific Examples and Comparative Examples, which are recited only for the purpose of explanation of the invention but are not for imparting any limitation to the scope of the invention.

Examples 6–11 and Comparative Examples 1–5 and 12–14

Each two-material double layer laminate composed of the layer A made of a cycloolefin-based resin or a resin composition containing a cycloolefin-based resin and the layer B made of an olefin (co)polymer or a composition containing it was produced under the condition given below. For the layer A made of a resin composition with cycloolefin-based resin, the starting resin extrusion mass was prepared preliminarily by dry blending the component resins in a proportion (on weight basis) given in Table 1 appearing afterwards and melt kneading the dry blend.

<The Starting Materials> o ETCD-3: A random copolymer of ethylene with tetracyclo(4.4.0.1$^{2.5}$.1$^{7.10}$)-3-dodecene (a cycloolefin corresponding to the formula (1) in which n=0, m=1, q=0 and R$^7$–R$^{18}$ denote each hydrogen atom; which is abbreviated hereinafter as ETCD-3, which has an intrinsic viscosity ($\eta$) of 0.67 dl/g and a softening temperature (TMA) of 90° C., was employed.

o PE-1: A polyethylene, with MFR=5.5 g/10 min. (at 190° C. under 2.16 Kg), density=0.968 g/cm$^3$ and Vicat softening point=125° C.

o PE-2: A polyethylene, with MFR=0.11 g/10 min. (at 190° C. under 2.16 Kg), density=0.952 g/cm$^3$ and Vicar softening point=122° C.

o PE-3: A polyethylene, with MFR=7.2 g/10 min. (at 190° C. under 2.16 Kg), density=0.917 g/cm$^3$ and Vicar softening point=86° C.

o PP-1: A polypropylene, with MFR=7.0 g/10 min. (at 230° C. under 2.16 Kg) and melting point=138° C.

o PP-2: A polypropylene, with MFR=3.0 g/10 min. (at 230° C. under 2.16 Kg) and melting point=151° C.

o PB-1: A polybutene-1, with MFR=4.0 g/10 min. (at 190° C. under 2.16 Kg) and density=0.900 g/cm$^3$ o P4MP-1: A poly-4-methylpentene-1, with MFR=22 g/10 min. (at 260° C. under 5 Kg), density=0.835 g/cm$^3$ and melting point=235° C.

o PPEP-1: A composition containing the PP-2 given above and an ethylene/propylene copolymer (EPR) with MFR= 0.1 g/10 min. (at 190° C. under 2.16 Kg) and an ethylene content of 80 mole % in a proportion of 85 parts by weight of the former and 15 parts by weight of the latter.

o PPEP-2: A composition containing the PP-2 given above and an ethylene/propylene copolymer (EPR) with MFR= 0.1 g/10 min. (at 190° C. under 2.16 Kg) and an ethylene content of 80 mole % in a proportion of 60 parts by weight of the former and 40 parts by weight of the latter.

The observed data of the resulting laminate for the breaking stress, breaking elongation, Young's modulus, Elmendorf's tear strength, film impact, light permeability, haze, moisture penetration coefficient, interlayer adhesion, heat sealing strength and the appearance of the sealed area are given in Table 1 below.

TABLE 1

|  | Condition | Comparative Example 14 | Comparative Example 2 | Comparative Example 3 | Comparative Example 4 | Comparative Example 5 |
|---|---|---|---|---|---|---|
| Resin of Layer A | — | ETCD-3 | ETCD-3 | ETCD-3 | ETCD-3 | ETCD-3 |
| Resin of Layer B | — | PP-1 | PP-2 | PE-3 | PB-1 | P4MP-1 |
| Layer Thickness: (layer A/layer B) (μm) | — | 70/30 | 70/30 | 70/30 | 70/30 | 70/30 |
| Breaking Stress: (longitudinal/lateral) (Kg/cm$^2$) | 23° C. | 450/430 | 450/450 | 400/410 | 410/430 | 420/420 |
| Breaking Elongation: (longitudinal/lateral) (%) | 23° C. | 5/5 | 5/5 | 3/3 | 5/5 | 4/4 |
| Young's Modulus: (longitudinal/lateral) (Kg/cm$^2$) | 23° C. | 20000/19800 | 21000/21000 | 18000/18000 | 18600/18800 | 19500/19500 |
| Elmendorf's Tear: (longitudinal/lateral) Strength (Kg/cm) | 23° C. | 7/9 | 8/8 | 7/7 | 8/8 | 6/7 |
| Film Impact: (longitudinal/lateral) (Kg · cm/cm) | 23° C. | 55 | 50 | 70 | 65 | 50 |
|  | 0° C. | 85 | 85 | 95 | 90 | 90 |
|  | −30° C. | 95 | 95 | 110 | 100 | 90 |
| Light Permeability (%) | 23° C. | 91 | 91 | 91 | 91 | 91 |
| Haze (%) | 23° C. | 5 | 4 | 4 | 6 | 5 |
| Moisture Penetration Coefficient (g · mm/m$^2$ · 24 hr) | 40° C., RH = 90% | 0.13 | 0.13 | 0.13 | 0.15 | 0.16 |
| Interlayer Adhesion (g/15 mm) | 23° C. | 80 | 40 | 40 | 40 | 40 |
| Heat-Sealing Strength (g/15 mm)/Appear.[1] | 110° C. | 0/better | 0/better | 200/better | 200/better | — |
|  | 120° C. | 0/better | 0/better | 250/better | 300/better | — |
|  | 130° C. | 200/better | 200/better | 400/better | 450/better | — |

TABLE 1-continued

| | Condition | Comparative Example 14 | Comparative Example 6 | Comparative Example 7 | Comparative Example 8 | Comparative Example 9 |
|---|---|---|---|---|---|---|
| Resin of Layer A[2] | — | ETCD-3 | ETCD3/ PE1 = 8/2 | ETCD3/ PE2 = 8/2 | ETCD3/ PE1 = 9/1 | ETCD3/ PE1 = 7/3 |
| Resin of Layer B | — | — | PE-3 | PE-3 | PE-3 | PP-1 |
| Layer Thickness: (layer A/layer B) (μm) | — | 100/0 | 70/3 | 70/3 | 70/3 | 70/30 |
| Breaking Stress: (longitudinal/lateral) (Kg/cm$^2$) | 23° C. | 500/600 | 330/120 | 350/130 | 360/120 | 450/420 |
| Breaking Elongation: (longitudinal/lateral) (%) | 23° C. | 2/3 | 3/20 | 4/25 | 3/13 | 3/5 |
| Young's Modulus: (longitudinal/lateral) (Kg/cm$^2$) | 23° C. | 27000/27000 | 16000/16000 | 16000/16000 | 17000/17000 | 17800/17900 |
| Elmendorf's Tear: (longitudinal/lateral) Strength (Kg/cm) | 23° C. | 12/12 | 3/7 | 3/7 | 5/7 | 5/6 |
| Film Impact: (longitudinal/lateral) (Kg · cm/cm) | 23° C. | 40 | 120 | 120 | 80 | 70 |
| | 0° C. | 80 | 130 | 130 | 100 | 100 |
| | −30° C. | 80 | 130 | 130 | 110 | 100 |
| Light Permeability (%) | 23° C. | 91 | 90 | 90 | 90 | 90 |
| Haze (%) | 23° C. | 0.3 | 10 | 10 | 9 | 20 |
| Moisture Penetration Coefficient (g · mm/m$^2$ · 24 hr) | 40° C., RH = 90% | 0.09 | 0.15 | 0.15 | 0.14 | 0.13 |
| Interlayer Adhesion (g/15 mm) | 23° C. | — | 550 | 530 | 500 | 430 |
| Heat-Sealing Strength (g/15 mm)/Appear.[1] | 110° C. | 210/better | 540/better | 530/better | 510/better | — |
| | 120° C. | 300/worse | — | — | — | — |
| | 130° C. | 300/worse | — | — | — | 400/better |

| | Condition | Comparative Example 10 | Comparative Example 11 | Example 12 | Example 13 |
|---|---|---|---|---|---|
| Resin of Layer A[2] | — | ETCD3/ PP1 = 7/3 | ETCD3/ PB1 = 7/3 | ETCD-3 | ETCD-3 |
| Resin of Layer B | — | PP-1 | PB-1 | PPEP-1 | PPEP-2 |
| Layer Thickness: (layer A/layer B) (μm) | — | 70/30 | 70/30 | 70/30 | 70/30 |
| Breaking Stress: (longitudinal/lateral) (Kg/cm$^2$) | 23° C. | 420/420 | 410/410 | 450/450 | 400/400 |
| Breaking Elongation: (longitudinal/lateral) (%) | 23° C. | 4/3 | 3/3 | 5/5 | 8/8 |
| Young's Modulus: (longitudinal/lateral) (Kg/cm$^2$) | 23° C. | 18100/18000 | 18000/17800 | 20000/20000 | 18000/18000 |
| Elmendorf's Tear: (longitudinal/lateral) Strength (Kg/cm) | 23° C. | 8/8 | 6/6 | 8/8 | 7/7 |
| Film Impact: (longitudinal/lateral) (Kg · cm/cm) | 23° C. | 80 | 90 | 55 | 70 |
| | 0° C. | 110 | 110 | 90 | 100 |
| | −30° C. | 110 | 120 | 100 | 120 |
| Light Permeability (%) | 23° C. | 89 | 87 | 91 | 91 |
| Haze (%) | 23° C. | 35 | 36 | 5 | 5 |
| Moisture Penetration Coefficient (g · mm/m$^2$ · 24 hr) | 40° C., RH = 90% | 0.15 | 0.15 | 0.14 | 0.15 |
| Interlayer Adhesion (g/15 mm) | 23° C. | 300 | 300 | 80 | 100 |
| Heat-Sealing Strength (g/15 mm)/Appear.[1] | 110° C. | — | 500/better | 0/better | 0/better |
| | 120° C. | — | 500/better | 50/better | 100/better |
| | 130° C. | 300/better | 500/better | 230/better | 300/better |

[1] Appearance over the sealed area
[2] Composition in weight ratio

Examples 14–19

Each extruded triple layer laminate with a lamination sequence of outer layer of a cycloolefin-based resin/inner layer of a soft copolymeric resin or its composition/outer layer of a polyethyrene resin was produced from each corresponding constituent resin as given below. The conditions, the physical parameters of the laminate and the testing method for the interlayer adhesion between the layers were as given below:

| | | |
|---|---|---|
| o Cycloolefin-based resin | ETCD-3 | (η) = 0.67 dl/g, TMA = 90° C. |
| o Soft copolymeric resin or resin | EBR | An ethylene/butene copolymer, MFR = 1.8 g/10 min. at 230° C., 2.16 Kg, content of ethylene unit = 80 mole %, degree of crystallinity = 15%, glass transition temperature Tg = −40° C. |
| blend | EPR | An ethylene/propylene copolymer, MFR = 5.4 g/10 min. at 230° C., 2.16 Kg, content of ethylene unit = 80 mole %, degree of crystallinity = 15%, glass transition temp. Tg = −40° C. |
| | Poly-ethylene | MFR = 2.0 g/10 min. at 190° C., 2.16 Kg, density = 0.92 g/cm$^3$, Vicat softening point = 102° C., degree of crystallinity = 50% |
| | Hydro-genated Petro- | A product of Arakawakagaku K.K.: ALCON P125 (Trademark), softening temperature = 125° C., |

-continued

| | leum Resin | bromine value = 2 |
|---|---|---|
| | EVA | An ethylene/vinyl acetate co-polymer, MFR = 2.0 g/10 min. at 190° C., 2.16 Kg, vinyl acetate content = 25 mole % |

Each soft copolymeric resin blend was prepared from the above resin components by melt kneading them in proportions given in Table 2 before being extruded by a co-extruder.

| | | |
|---|---|---|
| o | Polyethylene | MFR = 2.0 g/10 min. at 190° C., 2.16 Kg, density = 0.924 g/cm³ |
| o | Lamination | Triple-layered lamination from the above layer-constituting resins by extrusion |
| o | Lamination sequence | Outer layer of ETCD-3/inner layer of soft copolymeric resin or resin blend/ outer layer of polyethylene in layer thicknesses of 40/40/160 (μm) |
| o | Extruder | Outer layer: 40 mmφ extruder, 210° C. Inner layer: 40 mmφ extruder, 210° C. Outer layer: 40 mmφ extruder, 210° C. |
| o | Extrusion rate | 5 meters per minute |

For each of the resulting laminates, the interlayer adhesion was determined as follows:

The adhesion strength $F_{ETCD}$ between the outer ETCD-3 layer and the inner soft copolymeric resin layer and the adhesion strength $F_{PE}$ between the inner soft copolymeric resin layer and the outer polyethylene layer were observed by the T-peeling test at a peeling rate of 300 mm/min. The results are given in Table 2.

Example 20

A binary resin-double layer laminate consisting of ETCD-3 layer and the polyethylene (PE) layer used in the foregoing Examples 14–19 was produced. The layer construction was 40 μm ETCD-3/200 μm PE.

For each of the resulting laminates, the interlayer adhesion was determined in the same manner as in Examples 14–19.

The results are given in Table 2.

produced from each corresponding constituent resin as given below. The conditions, the physical parameters of the laminate and the testing method for the interlayer adhesion between the layers were as given below:

| | | |
|---|---|---|
| o Cycloolefin-based resin | ETCD-3 | (η) = 0.67 dl/g, TMA = 90° C. |
| o Soft copolymeric resin or resin blend | EBR | An ethylene/butene copolymer, MFR = 1.8 g/10 min. at 230° C., 2.16 Kg, content of ethylene unit = 80 mole %, degree of crystallinity = 15%, glass transition temperature Tg = −40° C. |
| | EPR | An ethylene/propylene copolymer, MFR = 5.4 g/10 min. at 230° C., 2.16 Kg, content of ethylene unit = 80 mole %, degree of crystallinity = 15%, glass transition temp. Tg = −40° C. |
| | Polypropylene | MFR = 7.0 g/10 min. at 230° C., 2.16 Kg, melting point = 138° C. |
| | Hydrogenated Petroleum Resin | A product of Arakawakagaku K.K.: ALCON P125 (Trademark), softening temperature = 125° C., bromine value = 2 |
| | EVA | An ethylene/vinyl acetate co-polymer, MFR = 2.0 g/10 min. at 190° C., 2.16 Kg, vinyl acetate content = 25 mole % |

Each soft copolymeric resin blend was prepared from the above resin components by melt kneading them in proportions given in Table 3 before being extruded by a co-extruder.

| | | |
|---|---|---|
| o | Polypropylene | MFR = 5.9 g/10 min. at 230° C., 2.16 Kg, melting point = 143° C. |
| o | Lamination | Triple-layered lamination from the above layer-constituting resins by coextrusion as in Examples 14–19 |
| o | Lamination sequence | Outer layer of ETCD-3/inner layer of soft copolymeric resin or resin blend/ outer layer of polypropylene in layer thicknesses of 40/40/160 (μm) |

For each of the resulting laminates, the interlayer adhesion was determined in the same manner as in Examples 14–19.

TABLE 2

| Soft Copolymeric Resin | Weight % Proportion in Example | | | | | | |
|---|---|---|---|---|---|---|---|
| | 14 | 15 | 16 | 17 | 18 | 19 | 20 |
| EBR | 100 | | | | | | — |
| EPR | | 100 | 80 | 80 | 30 | | — |
| Polyethylene | | | | | 70 | | — |
| Hydrogenated Petro. | | | 20 | | | 100 | — |
| Petro. Resin | | | | | | | |
| EVA | | | | 20 | | | — |
| Test Result | | | | | | | |
| $F_{ETCD}$ (g/15 mm) | 1500 | 1690 | not peeled | not peeled | 1010 | 50 | 50 |
| $F_{PE}$ (g/15 mm) | not peeled | not peeled | not peeled | not peeled | not peeled | not peeled | |

Examples 21–26

Each extruded triple layer laminate with a lamination sequence of outer cycloolefin-based resin layer/inner soft copolymeric resin layer/outer resin polypropyrene layer was The results are given in Table 3.

TABLE 3

| Soft Copoly-meric Resin | Weight % Proportion in Example | | | | | |
|---|---|---|---|---|---|---|
| | 21 | 22 | 23 | 24 | 25 | 26 |
| EBR | 100 | | | | | |
| EPR | | 100 | 80 | 80 | 30 | |
| Polypropylene | | | | | 70 | 100 |
| Hydrogenated Petro. Resin | | | 20 | | | |
| EVA | | | | 20 | | |
| Test Result | | | | | | |
| $F_{ETCD}$ (g/15 mm) | 800 | 770 | 1100 | 1020 | 540 | 40 |
| $F_{PP}$ (g/15 mm) | 1000 | 1100 | not peeled | not peeled | 950 | not peeled |

Example 27

A 500 ml bottle made of a laminate composed of inner layer of an ETCD-3 (i.e. an ethylene/TCD-3 random copolymer, with (η)=0.60 dl/g, softening temperature (TMA)=135° C. and outer layer of a polyethylene (with MFR=2.0 g/10 min.at 190° C., 2.16 Kg, density=0.924 g/cm³) was produced using a multilayer direct blow machine.

A test for the falling-crush strength of the bottle was carried out in the manner as follows: <Falling Impact Test of Blow-molded Bottle>

Each of 30 test bottles produced as above each filled with water is caused to fall onto concrete floor from an assumed crush height to detect occurence of fracture of the bottle, whereupon the falling test is succeeded by increasing or decreasing the falling height of the next bottle by a height of 30 cm or 10 cm in accordance with the presence or absence of bottle fracture, in order to find out the height at which 50% of the bottles were broken (50% crush height).

Results are given in Table 4.

Example 28

A 500 ml bottle made of a laminate composed of inner layer of the ethylene/TCD-3 random copolymer used in Example 27, an intermediate layer of a resin blend (referred to below as "PO") composed of 80% by weight of an ethylene/propylene random copolymer (content of ethylene unit=80 mole %, MFR=1.8 g/10 min. at 230° C., 2.16 Kg, degree of crystallinity=15%, glass transition temperature Tg=-40° C.) and 20% by weight of a hydrogenated petroleum resin (a product of Arakawakagaku K.K., ALKON P125 (Trademark), softening point=125° C., bromine value= 2) and another outer layer of the polyethylene used in Example 27 was produced using a multilayer direct blow machine and the test for the falling-crush strength of the bottle was carried out in the same manner as in Example 27.

The results are given in Table 4.

Comparative Example 2

Using the ethylene/TCD-3 random copolymer used in Example 27, a 500 ml direct blown bottle of single layer wall was produced.

The bottle falling-crush strength for the resulting bottle was determined in the same manner as in Example 27.

The results are given in Table 4.

TABLE 4

| | Example 27 | Example 28 | Comp. Example 2 |
|---|---|---|---|
| Layer material (outer/inner/outer) | PE/—/ETCD-3 | PE/PO/ETCD-3 | ETCD-3/—/— |
| Falling-cruch Strength (50% crush height in cm) | 95 | 140 | 30 |

Example 29

Using a two-resin triple layer sheet production machine furnished with two monoaxial extruder with a screw diameter of 40 mm φ, a binary resin triple layer laminate of PP-1/ETCD-3/PP-1=30/190/30 (μm) was produced while maintaining the cylinder temperature thereof at 210° C. On this laminate, a plurality of blister pockets for a blister pack were formed by vacuum shaping while heating it by an infrared lamp. In FIG. 1, the sectional structure of such a blister pack is shown. In this blister pack 1, the numeral 2 denotes the multilayer shaped product, 3 a sealing material, 4 an article to be packed, 5 the blister, 6 the flange portion, 7 an aluminum foil and 8 a layer of a heat-sealable resin.

The processibility of the laminate in forming the blister pocket upon the vacuum shaping was assessed. Also, the moisture penetration coefficient of the laminate was determined.

The results are given in Table 5.

Comparative Example 3

A monolayer sheet of ETCD-3 with a thickness of 250 μm was produced, on which blister pockets were formed in the same manner as in Example 29.

The processibility of the laminate in forming the blister pocket was assessed as in Example 29. The moisture penetration coefficient of the laminate was also determined.

The results are given in Table 5.

Comparative Example 4

A monolayer sheet of PP-1 with a thickness of 250 μm was produced, on which blister pockets were formed in the same manner as in Example 29.

The processibility of the laminate in forming the blister pocket was assessed as in Example 29. The moisture penetration coefficient of the laminate was also determined.

The results are given in Table 5.

TABLE 5

| | Example 29 | Comp. Example 3 | Comp. Example 4 |
|---|---|---|---|
| Penetration Coeff. (g · mm/m² · 24 hr) | 0.05 | 0.09 | 0.3 |
| Processibility[1] | ○ | Δ | X |

[1]Pocket shapability: Blister pockets each having a diameter of 13 mm and a depth of 6 mm were formed by a vacuum shaping, for which the finish appearance was visually assessed on the following criterion:
○: The edges of the pocket are sharp.
Δ: The edges of the pocket are somewhat round.
X: The pocket does not reach the mold bottom.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A polyolefin multilayer laminate, comprising
   (A) a first layer made of a cycloolefin-based resin composition composed of at least one cycloolefin-based resin selected from the group consisting of
      (a-1) an ethylene/cycloolefin random copolymer obtained by copolymerizing a cycloolefin represented by the general formula (1) or (2) given below with ethylene,
      (a-2) a ring-opening (co)polymer of cycloolefin(s) represented by the general formula (1) or (2) given below or its hydrogenation product, and
      (a-3) a graft-modification product of said ethylene/cycloolefin random copolymer (a-1) or of the ring-opening (co)polymer or its hydrogenation product (a-2), and a polyolefin, and
   (B) a second layer made of an olefin (co)polymer or a composition containing it:

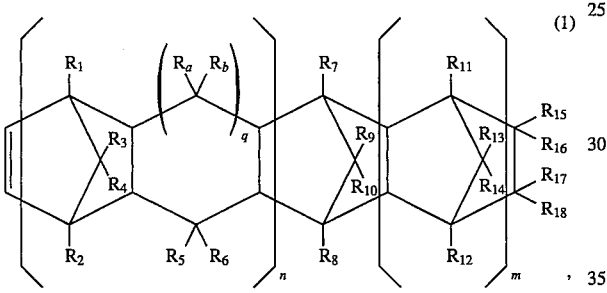

wherein n is zero or 1, m is zero or any positive integer, q is zero or 1, $R^1$–$R^{18}$ as well as $R^a$ and $R^b$ represent each independently of each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed thereby joining the chemical bonds together; and

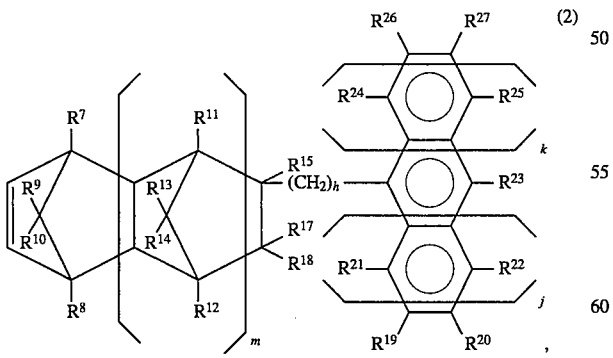

wherein m is zero or any positive integer, h is zero or any positive integer, j and k denote each zero, 1 or 2, $R^7$–$R^{15}$ as well as $R^{17}$–$R^{18}$ represent each independently of each other an atom or a radical selected from the group consisting of hydrogen atom, halogen atoms and hydrocarbon groups and $R^{19}$–$R^{27}$ represent each independently of each other an atom or a radical selected from the group consisting of hydrogen atom, halogen atoms, hydrocarbon groups and alkoxy groups.

2. A polyolefin multilayer laminate as in claim 1, wherein the ethylene/cycloolefin random copolymer (a-1), the ring-opening (co)polymer or its hydrogenation product (a-2) and the graft-modification product (a-3) have an intrinsic viscosity (η) of 0.01–10 dl/g, determined in decalin at 135° C., and a softening temperature (TMA) of at least 50° C.

3. A polyolefin multilayer laminate as in claim 1, wherein (B) said olefin (co)polymer is a polypropylene.

4. A polyolefin multilayer laminate as in claim 3, wherein the melting point (Tm) of the polypropylene is in the range of from 120°–145° C.

5. A polyolefin multilayer laminate as in claim 1, wherein said olefin (co)polymer is a polyethylene which has a density within the range of from 0.89–0.95 g/cm³.

6. A polyolefin multilayer laminate as in claim 1, wherein said polyolefin is either a polyethylene or a polypropylene.

7. A polyolefin multilayer laminate as in claim 1, wherein said cycloolefin-based resin is the ethylene/cycloolefin random copolymer (a-1).

8. A polyolefin multilayer laminate, comprising
   (A) a first layer selected from the group consisting of
      (A1) a layer made of at least one cycloolefin-based resin selected from the group consisting of
         (a1) an ethylene/cycloolefin random copolymer obtained by copolymerizing a cycloolefin represented by the general formula (1) or (2) given below with ethylene,
         (a-2) a ring-opening (co)polymer of cycloolefin(s) represented by the general formula (1) or (2) given below or its hydrogenation product, and
         (a-3) a graft-modification product of said ethylene/cycloolefin random copolymer (a-1) or of the ring-opening (co)polymer or its hydrogenation product (a-2), and
      (A2) a layer made of a cycloolefein-based resin composition composed of
         (a) at least one cycloolefin-based resin selected from the group consisting of the ethylene/cycloolefin random copolymer (a-1), the ring-opening (co)polymer or its hydrogenation product (a-2) and the graft-modification product (a-3) and
         (b) a polyolefin, and
   (B) a second layer made of an olefin (co)polymer or a composition containing it, wherein the layers (A) and (B) are bonded by
   (C) an interposed third layer made of a soft, low- or non-crystalline copolymeric resin or resin blend having a degree of crystallinity of not higher than 40% and a glass transition temperature of not higher than 0° C.:

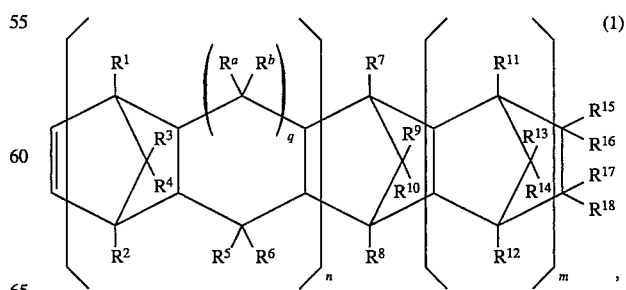

wherein n is zero or 1, m is zero or any positive integer, q is zero or 1, $R^1$–$R^{18}$ as well as $R^a$ and $R^b$ represent each independently of each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed there by joining the chemical bonds together; and

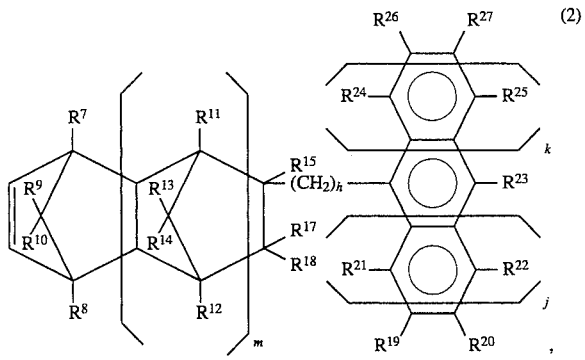

wherein m is zero or any positive integer, h is zero or any positive interger, j and k denote each zero, 1 or 2, $R^7$–$R^{15}$ as well as $R^{17}$–$R^{18}$ represent each independently of each other an atom or a radical selected from the group consisting of hydrogen atom, halogen atoms and hydrocarbon groups and $R^{19}$–$R^{27}$ represent each independently of each other an atom or a radical selected from the group consisting of hydrogen atom, halogen atoms, hydrocarbon groups and alkoxy groups.

9. A polyolefin multilayer laminate as in claim 8, wherein the soft, low- or non-crystalline copolymeric resin blend is composed of 60–98%, based on the weight of the blend, of an ethylene/α-olefin random copolymer and 2–40%, based on the weight of the blend, of a tackifying agent consisting of an aliphatic hydrocarbon resin and/or a cycloaliphatic hydrocarbon resin obtained by hydrogenating an aromatic hydrocarbon resin.

10. A polyolefin multilayer laminate as in claim 8, wherein the soft, low- or non-crystalline copolymeric resin blend is composed of 60–98%, based on the weight of the blend, of an ethylene/α-olefin random copolymer and 2–40%, based on the blend, of an ethylene/vinyl acetate random copolymer and/or an ethylene/vinyl alcohol random copolymer.

11. A polyolefin multilayer laminate as in claim 8, wherein the soft, low- or non-crystalline copolymeric resin is an ethylene/α-olefin random copolymer.

12. A vessel or a packaging material made of a polyolefin multilayer laminate, comprising
(A) a first layer made of a cycloolefin-based resin composition composed of at least one cycloolefin-based resin selected from the group consisting of
(a-1) an ethylene/cycloolefin random copolymer obtained by copolymerizing a cycloolefin represented by the general formula (1) or (2) given below with ethylene,
(a-2) a ring-opening (co)polymer of cycloolefin(s) represented by the general formula (1) or (2) given below or its hydrogenation product, and
(a-3) a graft-modification product of said ethylene/ cycloolefin random copolymer (a-1) or of the ring-opening (co)polymer or its hydrogenation product (a-2), and a polyolefin, and (B) a second layer made of an olefin (co)polymer or a composition containing it:

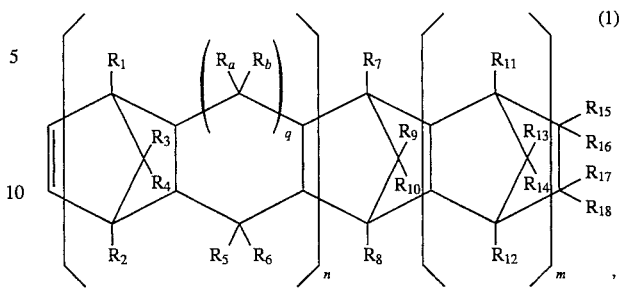

wherein n is zero or 1, m is zero or any positive integer, q is zero or 1, $R^1$–$R^{18}$ as well as $R^a$ and $R^b$ represent each independently of each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed thereby joining the chemical bonds together; and

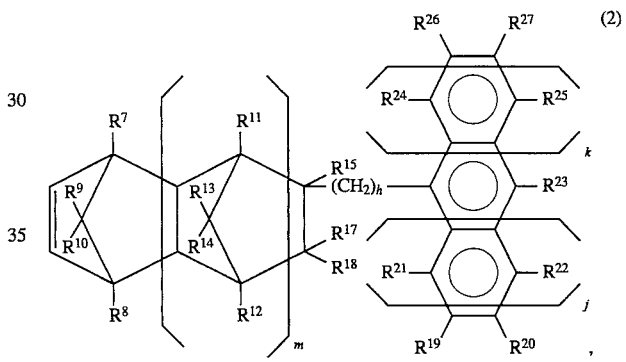

wherein m is zero or any positive integer, h is zero or any positive integer, j and k denote each zero, 1 or 2, $R^7$–$R^{15}$ as well as $R^{17}$–$R^{18}$ represent each independently of each other an atom or a radical selected from the group consisting of hydrogen atom, halogen atoms and hydrocarbon groups and $R^{19}$–$R^{27}$ represent each independently of each other an atom or a radical selected from the group consisting of hydrogen atom, halogen atoms, hydrocarbon groups and alkoxy groups.

13. A vessel or a packaging material made of a polyolefin multilayer laminate, comprising
(A) a first layer selected from the group consisting of
(A1) a layer made of at least one cycloolefin-based resin selected from the group consisting of
(a-1) an ethylene/cycloolefin random copolymer obtained by copolymerizing a cycloolefin represented by the general formula (1) or (2) given below with ethylene,
(a-2) a ring-opening (co)polymer of cycloolefin(s) represented by the general formula (1) or (2) given below or its hydrogenation product, and
(a-3) a graft-modification product of said ethylene/ cycloolefin random copolymer (a-1) or of the ring-opening (co)polymer or its hydrogenation product (a-2), and
(A2) a layer made of a cycloolefin-based resin composition composed of (a) at least one cycloolefin-based resin selected from the group consisting of the ethylene/cycloolefin random copolymer (a-1), the ring-opening (co)polymer or its hydrogenation product (a-2) and the graft-modification product (a-3), and
(b) a polyolefin, and (B) a second layer made of an olefin (co)polymer or a composition containing it, wherein the layers (A) and (B) are bonded by (C) an interposed third layer made of a soft, low-or non-crystalline copolymeric resin or resin blend having a degree of crystallinity of not higher than 40% and a glass transition temperature of not higher than 0° C.:

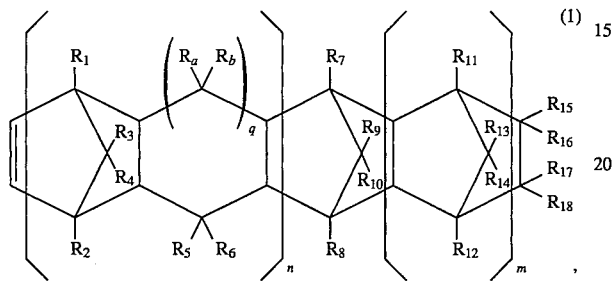
(1)

wherein n is zero or 1, m is zero or any positive integer, q is zero or 1, $R^1$–$R^{18}$ as well as $R^a$ and $R^b$ represent each independently of each other an atom or a radical selected from the group consisting of hydrogen atom, halogen atoms and hydrocarbon groups, wherein $R^{15}$–$R^{18}$ may form a monocyclic ring or a polycyclic ring by combining with each other or may form an alkylidene group by a chemical combination of $R^{15}$ with $R^{16}$ or $R^{17}$ with $R^{18}$ and wherein the monocyclic or polycyclic ring formed from $R^{15}$–$R^{18}$ may have one or more double bonds and, in the case of q=0, a five-membered ring is formed thereby joining the chemical bonds together; and

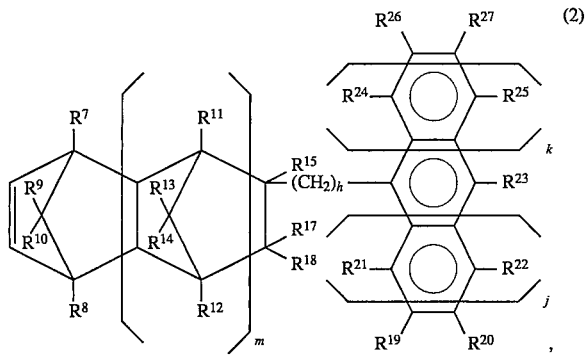
(2)

wherein m is zero or any positive integer, h is zero or any positive integer, j and k denote each zero, 1 or 2, $R^7$–$R^{15}$ as well as $R^{17}$–$R^{18}$ represent each independently of each other an atom or a radical selected from the group consisting of hydrogen atom, halogen atoms and hydrocarbon groups and $R^{19}$–$R^{27}$ represent each independently of each other an atom or a radical selected from the group consisting of hydrogen atom, halogen atoms, hydrocarbon groups and alkoxy groups.

14. A vessel or a packaging material as in claim 12, wherein the packaging material is a press through pack or a blister pack.

15. A vessel or a packaging material as in claim 13, wherein the packaging material is a press through pack or a blister pack.

* * * * *